(12) United States Patent
Oh et al.

(10) Patent No.: US 9,910,316 B2
(45) Date of Patent: Mar. 6, 2018

(54) BACKLIGHT UNIT AND DISPLAY DEVICE INCLUDING BACKLIGHT UNIT

(71) Applicant: LG ELECTRONICS INC., Seoul (KR)

(72) Inventors: Sewon Oh, Seoul (KR); Eunseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/348,622

(22) Filed: Nov. 10, 2016

(65) Prior Publication Data

US 2017/0059936 A1    Mar. 2, 2017

Related U.S. Application Data

(63) Continuation of application No. 14/928,621, filed on Oct. 30, 2015, now Pat. No. 9,740,047.

(Continued)

(30) Foreign Application Priority Data

Jul. 31, 2015 (KR) .......................... 10-2015-0109157
Jul. 31, 2015 (KR) .......................... 10-2015-0109161

(51) Int. Cl.
    *G02F 1/1335*    (2006.01)
    *F21V 7/04*    (2006.01)

(52) U.S. Cl.
    CPC .......... *G02F 1/133603* (2013.01); *F21V 7/04* (2013.01); *G02F 1/133605* (2013.01);
    (Continued)

(58) Field of Classification Search
    CPC ......... G02F 1/133603; G02F 1/133605; G02F 1/133606; G02F 1/133611; G02F 1/133608; F21V 7/04
    See application file for complete search history.

(56) References Cited

U.S. PATENT DOCUMENTS 7,658,504 B2    2/2010   Moriyasu et al.
8,651,685 B2    2/2014   Roberts et al.
(Continued)

FOREIGN PATENT DOCUMENTS

CN    1794063 A    6/2006
CN    1987599 A    6/2007
(Continued)

*Primary Examiner* — Karabi Guharay
(74) *Attorney, Agent, or Firm* — Birch, Stewart, Kolasch & Birch, LLP

(57) ABSTRACT

A backlight unit including a frame including a bottom and a sidewall extending from the bottom; at least one substrate located on the frame, and a plurality of light sources mounted on the at least one substrate; and a reflecting sheet located on the at least one substrate, further the reflecting sheet includes a first sheet part located on the bottom, the first sheet part including a plurality of holes corresponding to the plurality of the light sources; and a second sheet part extended from the first sheet part, the second sheet part including a horizontal dot area located along a long side of the reflecting sheet and a vertical dot area located along a short side of the reflecting sheet, and at least one of the horizontal dot area and the vertical dot area comprising first areas and second areas, also the first areas correspond to outermost holes among the plurality of holes, and the second areas are located between the first areas, in addition the first areas and the second areas include a plurality of dot areas, further each of the dot areas includes a plurality of dots, also a size of dots included in one of the plurality of dot areas is different from a size of dots included in another of the plurality of dot areas in the first area, in addition a size of dots included in one of the plurality of dot areas is different from a size of dots included in another of the plurality of dot areas in the second area, further the first and second areas comprise first dot areas, the first dot areas are positioned at a same distance between a first distance and a second (Continued)

distance from a line, the line being an imaginary line connecting the outermost holes along at least one of the long side and the short side of the reflecting sheet, and also a size of dots included in the first dot area of the first area is greater than a size of dots included in the first dot area of the second area.

30 Claims, 38 Drawing Sheets

Related U.S. Application Data

(60) Provisional application No. 62/073,509, filed on Oct. 31, 2014.

(52) U.S. Cl.
CPC .. *G02F 1/133606* (2013.01); *G02F 1/133608* (2013.01); *G02F 1/133611* (2013.01)

(56) References Cited

U.S. PATENT DOCUMENTS

| | | |
|---|---|---|
| 2006/0104080 A1 | 5/2006 | Kim et al. |
| 2007/0146297 A1 | 6/2007 | Bang |
| 2007/0211449 A1 | 9/2007 | Holman et al. |
| 2009/0067158 A1 | 3/2009 | Hamada |
| 2009/0168399 A1 | 7/2009 | Kim et al. |
| 2009/0213296 A1 | 8/2009 | Park et al. |
| 2009/0289880 A1 | 11/2009 | Byoun et al. |
| 2010/0296270 A1 | 11/2010 | Gomi et al. |
| 2011/0013119 A1 | 1/2011 | Ha et al. |
| 2011/0050735 A1 | 3/2011 | Bae et al. |
| 2011/0109814 A1 | 5/2011 | Takemura |
| 2011/0304796 A1 | 12/2011 | Lee et al. |
| 2011/0305004 A1 | 12/2011 | Kim et al. |
| 2012/0069248 A1 | 3/2012 | Yokota |
| 2012/0106147 A1 | 5/2012 | Kim et al. |
| 2012/0170253 A1 | 7/2012 | Park et al. |
| 2012/0206940 A1 | 8/2012 | Han et al. |
| 2012/0236204 A1 | 9/2012 | Kasai |
| 2012/0287347 A1 | 11/2012 | Matsumoto |
| 2013/0016524 A1 | 1/2013 | Momose et al. |
| 2013/0070170 A1 | 3/2013 | Namekata |
| 2013/0188114 A1 | 7/2013 | Sugaya |
| 2013/0329401 A1 | 12/2013 | Yamamoto et al. |
| 2014/0184985 A1 | 7/2014 | Liu et al. |
| 2014/0204578 A1 | 7/2014 | Kim et al. |
| 2014/0211121 A1 | 7/2014 | Cho et al. |
| 2014/0253845 A1 | 9/2014 | Shibata |
| 2014/0307421 A1 | 10/2014 | Lee et al. |
| 2015/0146436 A1 | 5/2015 | Heo et al. |

FOREIGN PATENT DOCUMENTS

| | | |
|---|---|---|
| CN | 102287682 A | 12/2011 |
| CN | 102466179 A | 5/2012 |
| CN | 102667311 A | 9/2012 |
| CN | 103032777 A | 4/2013 |
| CN | 203643721 U | 6/2014 |
| CN | 104100880 A | 10/2014 |
| EP | 2 426 395 A1 | 3/2012 |
| EP | 2 515 027 A1 | 10/2012 |
| JP | 2003-257230 A | 9/2003 |
| JP | 2006-520518 A | 9/2006 |
| JP | 2013-143217 A | 7/2013 |
| JP | 2013-239335 A | 11/2013 |
| KR | 10-2007-0079259 A | 8/2007 |
| KR | 10-0949117 B1 | 3/2010 |
| KR | 10-1165840 B1 | 7/2012 |
| KR | 10-2013-0063773 A | 6/2013 |
| TW | 200403502 A | 3/2004 |
| TW | 200825552 A | 6/2008 |
| TW | 200907438 A | 2/2009 |
| WO | WO 2010/146892 A1 | 12/2010 |

(a)

(b)

(a)

(b)

BACKLIGHT UNIT AND DISPLAY DEVICE INCLUDING BACKLIGHT UNIT

This application is a Continuation of copending U.S. application Ser. No. 14/928,621, filed on Oct. 30, 2015, which claims priority under 35 U.S.C. § 119(e) to U.S. Provisional Application No. 62/073,509 filed on Oct. 31, 2014, and under 35 U.S.C. § 119(a) to the priority benefit of Korean Patent Application No. 10-2015-0109157 and Korean Patent Application No. 10-2015-0109161 both filed in the Korean Intellectual Property Office on Jul. 31, 2015, the entire contents of which are incorporated herein by reference for all purposes as if fully set forth herein.

BACKGROUND OF THE INVENTION

Field of the Invention

The present disclosure relates to a backlight unit and a display device including the backlight unit.

Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

The present disclosure provides a backlight unit including a reflecting sheet having a dot area.

In one aspect, there is a backlight unit including a frame including a bottom and a sidewall extending from the bottom; at least one substrate located on the frame, and a plurality of light sources mounted on the at least one substrate; and a reflecting sheet located on the at least one substrate, wherein the reflecting sheet includes: a first sheet part located on the bottom, the first sheet part including a plurality of holes corresponding to the plurality of the light sources, and a plurality of first dots; and a second sheet part extended from the first sheet, the second sheet part including a plurality of second dots, wherein the plurality of first dots are positioned adjacent to at least one of the plurality of holes.

The first sheet part may include an outer area including at least one outermost hole of the plurality of holes and an inner area including at least one inner hole of the plurality of holes, the inner area being surrounded by the outer area.

The plurality of first dots may be positioned around the at least one outermost hole in the outer area.

The plurality of first dots may be further positioned around the at least one inner hole in the inner area.

The plurality of first dots may be positioned in a partial surrounding area of the at least one outermost hole in the outer area.

Sizes of a plurality of dots of the plurality of first dots may be the same as each other.

A plurality of dots of the plurality of first dots may include at least two dots having different sizes.

The plurality of second dots may include a horizontal dot area formed along a first side of the reflecting sheet and a vertical dot area formed along a second side of the reflecting sheet, and wherein a surface area of a first hole of the plurality of holes may be different from a surface area of a second hole of the plurality of holes, the first hole may be at least one hole adjacent to the horizontal dot area, and the second hole may be at least one hole adjacent to the vertical dot area.

The plurality of first dots may be positioned around remaining outermost holes excluding at least one outermost hole adjacent to a corner of the reflecting sheet from outermost holes included in the outer area.

The plurality of first dots may be positioned around the at least one inner hole in the inner area.

In the inner area, a first hole of the plurality of holes may have the plurality of first dots and a second hole of the plurality of holes may not have the plurality of first dots positioned adjacent to each other.

In the outer area, first holes of the plurality of holes adjacent to a first side of the reflecting sheet may be symmetric with second holes of the plurality of holes adjacent to a third side of the reflecting sheet.

The backlight unit may further include a hole sheet inserted into at least one of the plurality of holes, wherein the plurality of first dots may further include dots on the hole sheet.

Sizes and densities of dots of the plurality of first dots may be the same as each other.

At least one of sizes and densities of dots in the plurality of first dots may be different from each other.

At least one of the plurality of holes may have a straight portion and a curved portion.

The backlight unit may further include a plurality of support plate holes, into which support plates are inserted respectively.

The first sheet part may include a third dot area includes a plurality of third dots, and may be positioned adjacent to at least one of the plurality of support plate holes.

The third dot area may have an asymmetric shape.

The at least one substrate may be in plural, and wherein the reflecting sheet may further include at least one cut part corresponding to at least one connection portion between the plurality of the substrates.

The backlight unit may further include a third sheet part extended from the second sheet and located on the sidewall.

In other aspect, there is a display device including a frame including a bottom and a sidewall extending from the bottom; at least one substrate located on the frame, and a plurality of light sources mounted on the at least one substrate; a reflecting sheet located on the at least one substrate, an optical sheet located on the reflecting sheet; and a display panel located on the optical sheet, wherein the reflecting sheet may include: a first sheet part located on the bottom, the first sheet part including a plurality of holes corresponding to the plurality of the light sources, and a plurality of first dots; and a second sheet part extended from the first sheet, the second sheet part including a plurality of second dots; wherein the plurality of first dots are positioned adjacent to at least one of the plurality of holes.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
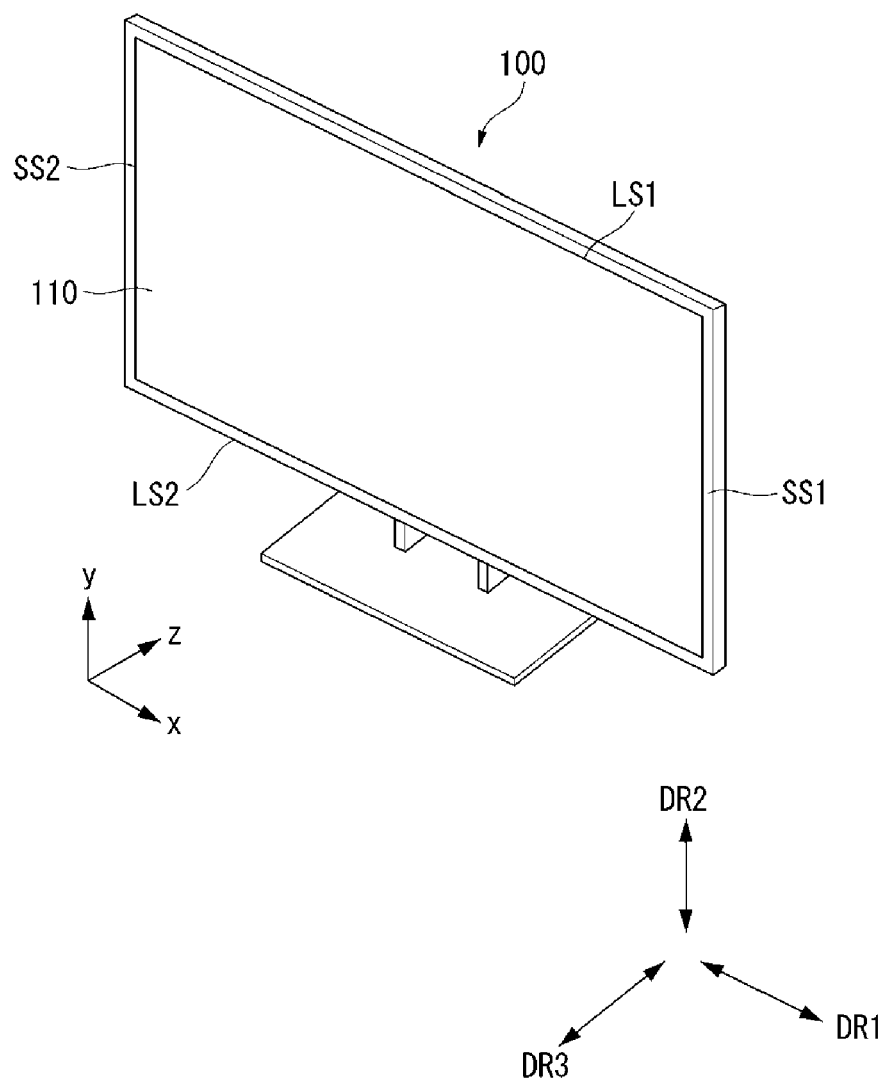
FIGS. 1 and 2 illustrate a display device according to an example embodiment of the invention.

Reference will now be made in detail to embodiments of the invention, examples of which are illustrated in the accompanying drawings. Wherever possible, the same reference numbers will be used throughout the drawings to refer to the same or like parts. A suffix such as "module" and "unit" may be assigned or used interchangeably to refer to elements or components. Use of such a suffix herein is merely intended to facilitate the description of the embodiments of the invention, and the suffix itself is not intended to give any special meaning or function. It will be paid attention that detailed description of known arts will be omitted if it is determined that the detailed description of the known arts can obscure the embodiments of the invention. The accompanying drawings are merely intended to easily describe the embodiments of the invention, and the spirit and technical scope of the present invention is not limited by the accompanying drawings. It should be understood that the present invention is not limited to specific disclosed embodiments, but includes all modifications, equivalents and substitutes included within the spirit and technical scope of the present invention.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display panel may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel, and a second direction DR2 may be a direction parallel to the short sides SS1 and SS2 of the display panel.

Further, a third direction DR3 may be a direction vertical to the first direction DR1 and/or the second direction DR2.

In the embodiment disclosed herein, the first direction DR1 and the second direction DR2 may be commonly referred to as a horizontal direction.

Further, the third direction DR3 may be referred to as a vertical direction.

Figure 2:
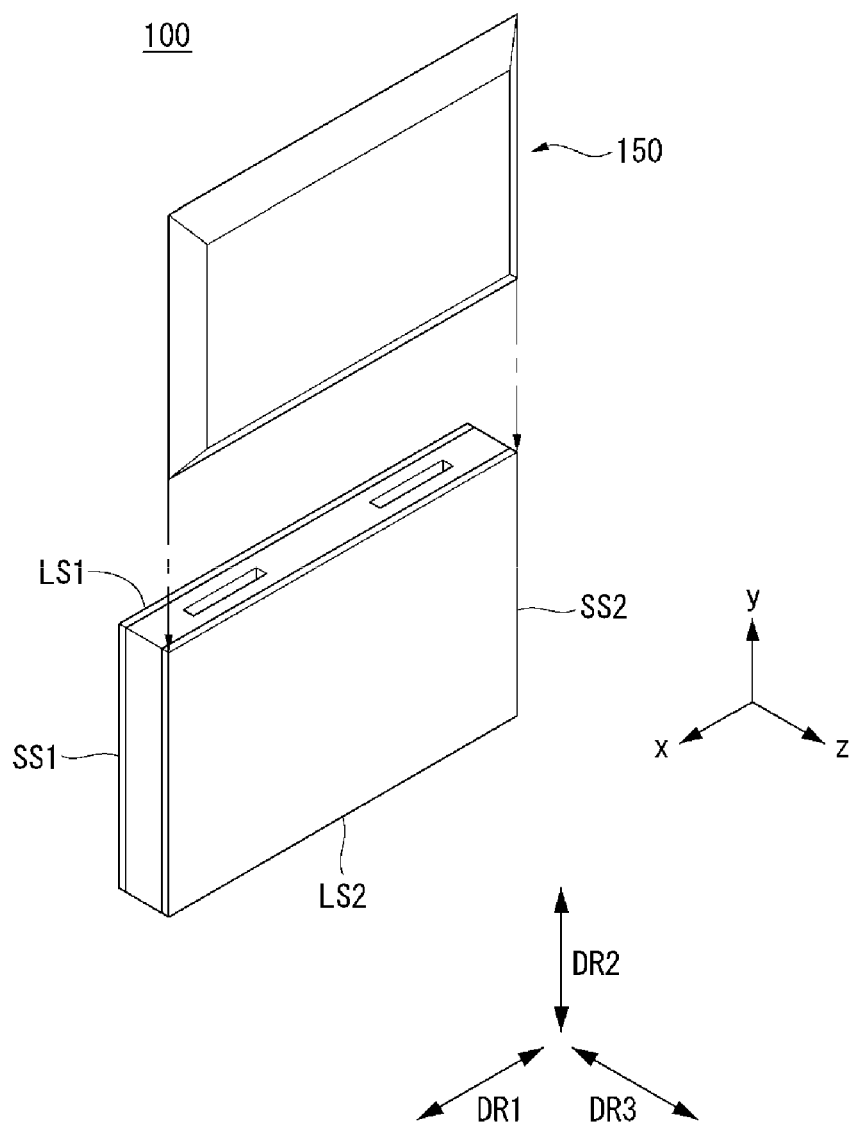

FIGS. 1 and 2 illustrate a display device according to an example embodiment of the invention.

As shown in FIGS. 1 and 2, a display device 100 according to the embodiment of the invention may include a display panel 110 and a back cover 150 positioned in the rear of the display panel 110.

The back cover 150 may be connected to the display panel 110 in a sliding manner in a direction (i.e., the second direction DR2) from the first long side LS1 to the second long side LS2. In other words, the back cover 150 may be inserted into the first short side SS1, the second short side SS2 opposite the first short side SS1, and the first long side LS1 which is adjacent to the first and second short sides SS1 and SS2 and is positioned between the first short side SS1 and the second short side SS2, of the display panel 110 in the sliding manner.

The back cover 150 and/or other components adjacent to the back cover 150 may include a protrusion, a sliding unit, a connection unit, etc., so that the back cover 150 is connected to the display panel 110 in the sliding manner.

FIGS. 3 to 7 illustrate configuration of a display device related to the embodiment of the invention.

Figure 3:
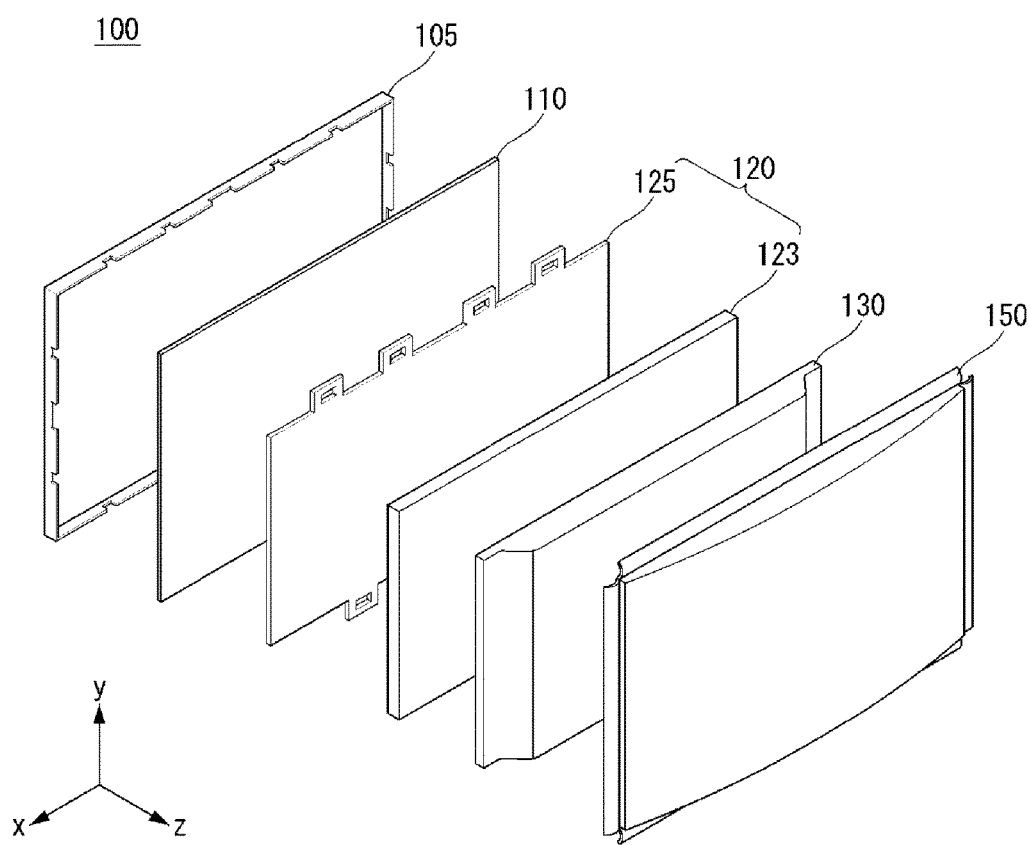
FIGS. 3 to 7 illustrate configuration of a display device related to an example embodiment of the invention.

As shown in FIG. 3, the display device 100 according to the embodiment of the invention may include a front cover 105, the display panel 110, a backlight unit 120, a frame 130, and the back cover 150.

The front cover 105 may cover at least a portion of a front surface and a side surface of the display panel 110. The front cover 105 may have a rectangular fame shape, in which a center portion is empty. Because the center portion of the front cover 105 is empty, an image displayed on the display panel 110 may be seen to the outside.

The front cover 105 may include a front cover and a side cover. Namely, the front cover 105 may include the front cover positioned at the front surface of the display panel 110 and the side cover at the side surface of the display panel 110. The front cover and the side cover may be separately configured. One of the front cover and the side cover may be omitted. For example, the front cover may be omitted, and only the side cover may be absent in terms of a beautiful appearance of the display device 100.

The display panel 110 may be positioned in front of the display device 100 and may display an image. The display panel 110 may divide the image into a plurality of pixels and may output the image while controlling color, brightness, and chroma of each pixel. The display panel 110 may include an active area, on which the image is displayed, and an inactive area, on which the image is not displayed. The display panel 110 may include a front substrate and a back substrate which are positioned opposite each other with a liquid crystal layer interposed therebetween.

The front substrate may include a plurality of pixels each including red, green, and blue subpixels. The front substrate may generate an image corresponding to the red, green, or blue color in response to a control signal.

The back substrate may include switching elements. The back substrate may turn on pixel electrodes. For example, the pixel electrode may change a molecule arrangement of the liquid crystal layer in response to a control signal received from the outside. The liquid crystal layer may include a plurality of liquid crystal molecules. The arrangement of the liquid crystal molecules may change depending on a voltage difference between the pixel electrode and a common electrode. The liquid crystal layer may transmit light provided by the backlight unit 120 to the front substrate.

The backlight unit 120 may be positioned at a back surface of the display panel 110. The backlight unit 120 may include a plurality of light sources. The light sources of the backlight unit 120 may be arranged in an edge type or a direct type. In an instance of the edge type backlight unit 120, a light guide plate may be added.

The backlight unit 120 may be coupled to a front surface of the frame 130. For example, the plurality of light sources may be disposed at the front surface of the frame 130. In this instance, the backlight unit 120 may be commonly called the direct type backlight unit 120.

The backlight unit 120 may be driven in an entire driving method or a partial driving method such as a local dimming method and an impulsive driving method. The backlight unit 120 may include an optical sheet 125 and an optical layer 123.

The optical sheet 125 can cause light of the light sources to be uniformly transferred to the display panel 110. The optical sheet 125 may include a plurality of layers. For example, the optical sheet 125 may include at least one prism sheet and/or at least one diffusion sheet.

The optical sheet 125 may further include at least one coupling unit 125d. The coupling unit 125d may be coupled to the front cover 105 and/or the back cover 150. Namely, the coupling unit 125d may be directly coupled to the front cover 105 and/or the back cover 150. Alternatively, the coupling unit 125d may be coupled to a structure formed on the front cover 105 and/or the back cover 150. Namely, the coupling unit 125d may be indirectly coupled to the front cover 105 and/or the back cover 150.

The optical layer 123 may include the light source, etc. The detailed configuration of the optical layer 123 will be described in the corresponding paragraphs.

The frame 130 may support components constituting the display device 100. For example, the frame 130 may be coupled to the backlight unit 120. The frame 130 may be formed of a metal material, for example, an aluminum alloy.

The back cover 150 may be positioned at a back surface of the display device 100. The back cover 150 may protect inner configuration of the display device 100 from the outside. At least a portion of the back cover 150 may be coupled to the frame 130 and/or the front cover 105. The back cover 150 may be an injection production (or injection molded) formed of a resin material.

Figure 4:
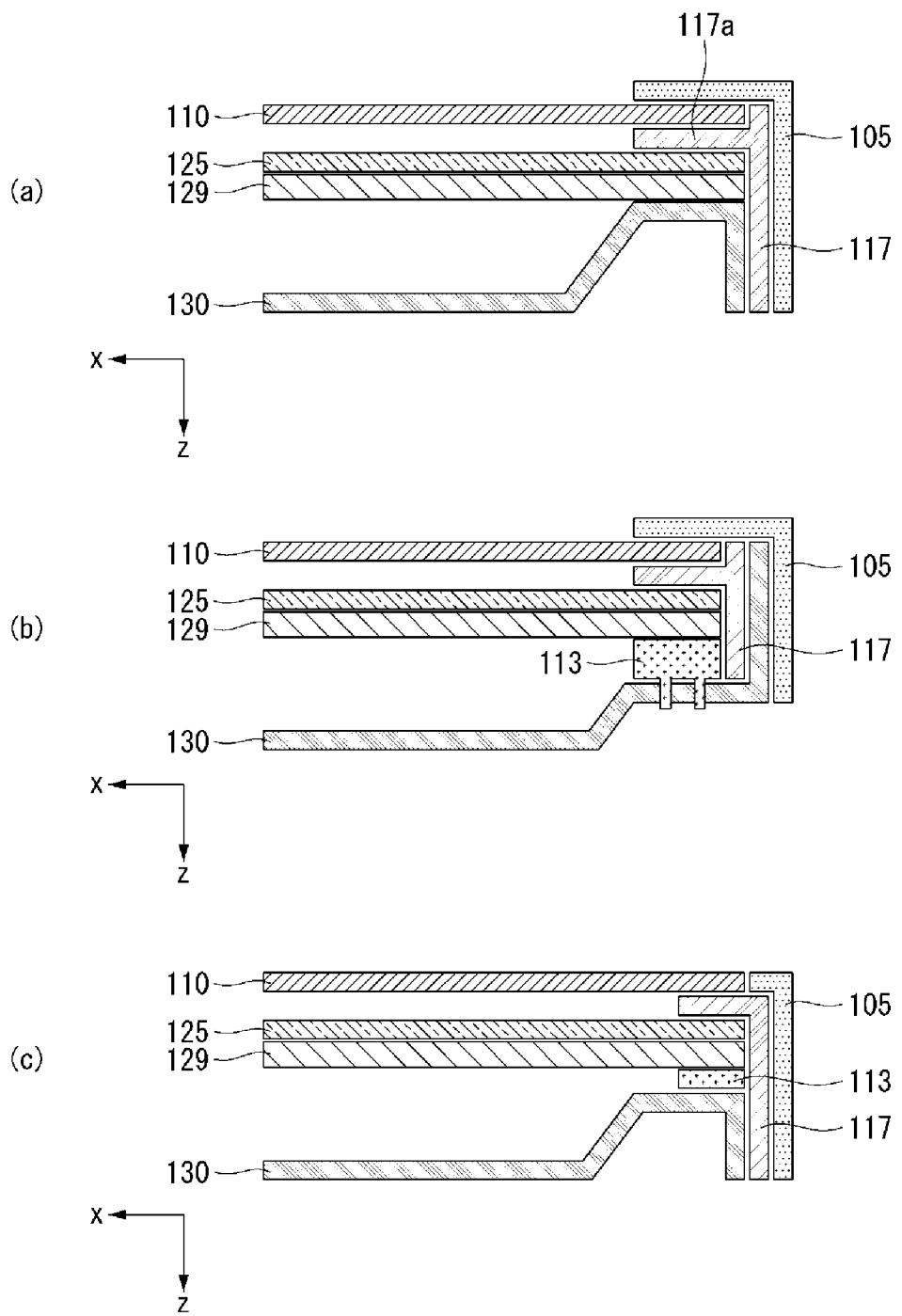

FIG. 4 shows the configuration of the optical sheet 125.

As shown in (a) of FIG. 4, the optical sheet 125 and/or a diffusion plate 129 may be positioned on the frame 130. The optical sheet 125 and/or the diffusion plate 129 may be coupled to the frame 130 at an edge of the frame 130. The optical sheet 125 and/or the diffusion plate 129 may be directly placed at the edge of the frame 130. Namely, an outer perimeter of the optical sheet 125 and/or the diffusion plate 129 may be supported by the frame 130. An upper surface of an edge of the optical sheet 125 and/or the diffusion plate 129 may be surrounded by a first guide panel 117. For example, the optical sheet 125 and/or the diffusion plate 129 may be positioned between the edge of the frame 130 and a flange 117a of the first guide panel 117.

The display panel 110 may be positioned at a front surface of the optical sheet 125. An edge of the display panel 110 may be coupled to the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 4, the display device 100 according to the embodiment of the invention may further include a second guide panel 113. The optical sheet 125 and/or the diffusion plate 129 may be coupled to the second guide panel 113. Namely, the second guide panel 113 may have a shape, in which the second guide panel 113 is coupled to the frame 130 and the optical sheet 125 and/or the diffusion plate 129 are/is coupled to the second guide panel 113. The second guide panel 113 may be formed of a material different from the frame 130. The frame 130 may have a shape surrounding the first and second guide panels 117 and 113.

As shown in (c) of FIG. 4, in the display device 100 according to the embodiment of the invention, the front cover 105 may not cover the front surface of the display panel 110. Namely, one end of the front cover 105 may be positioned on the side of the display panel 110.

Figure 5:
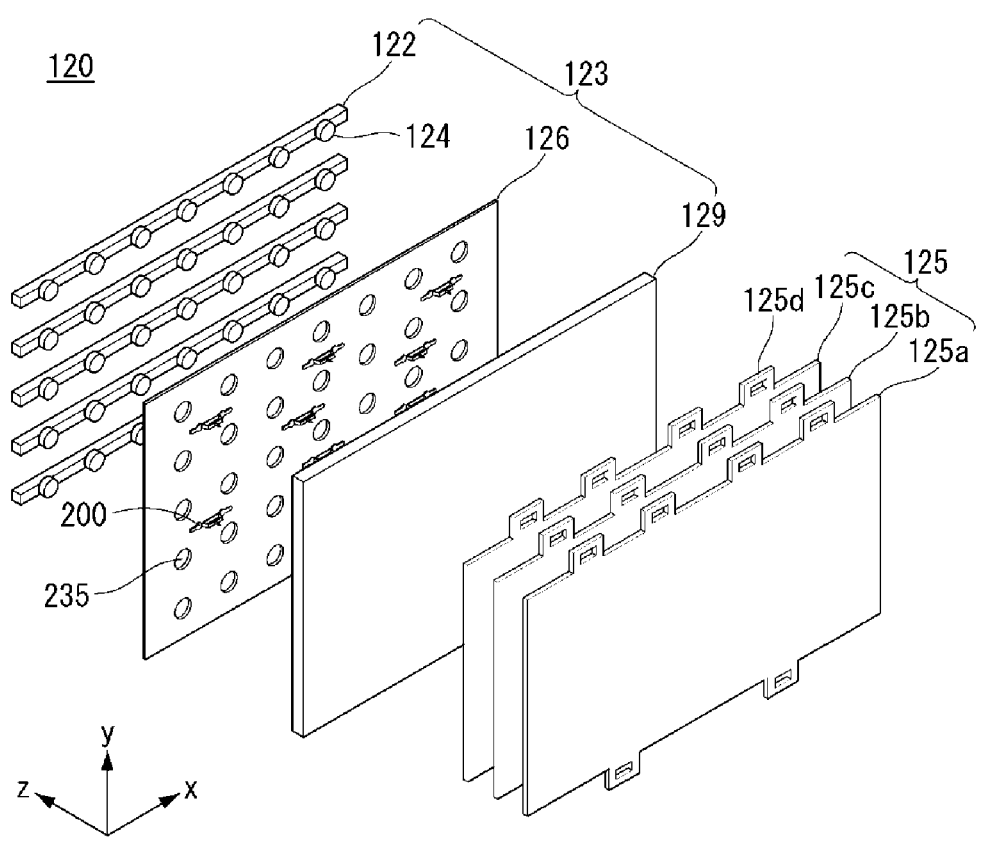
Figure 6:
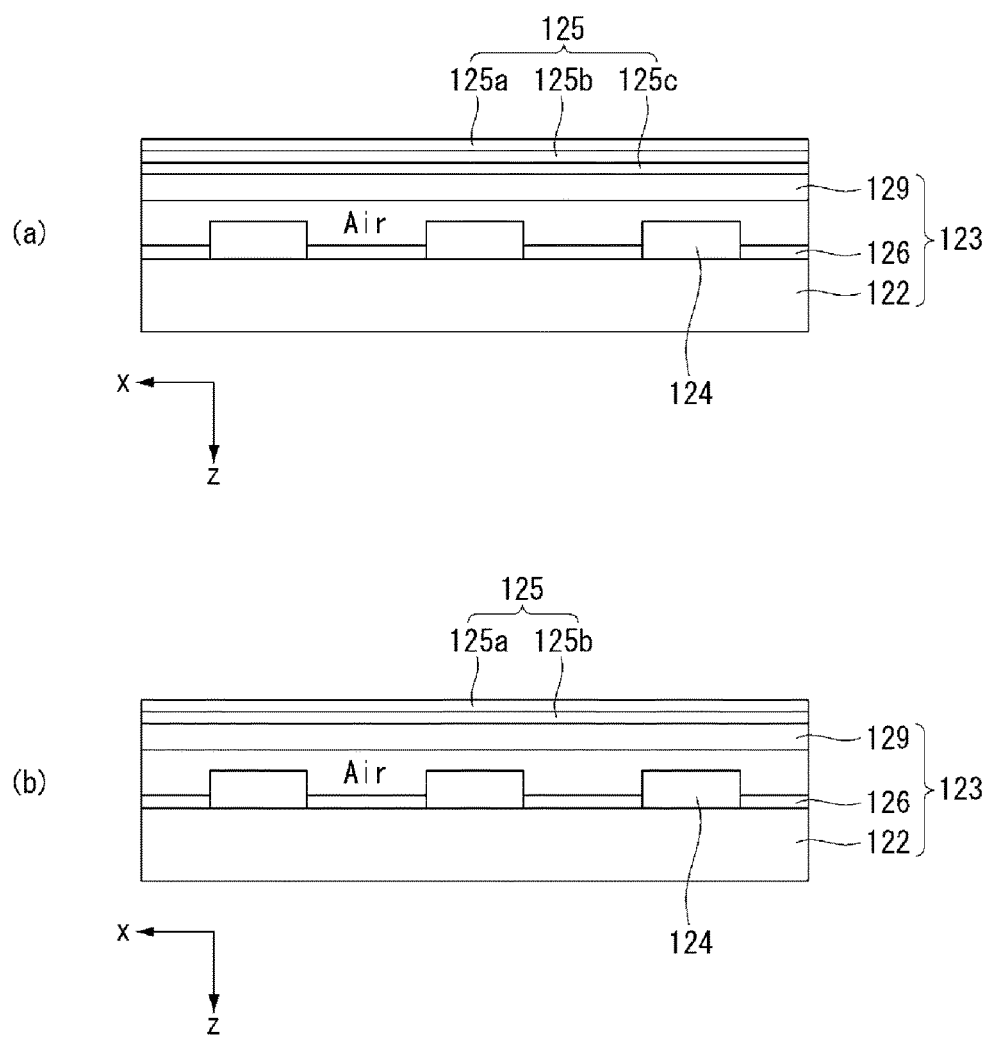

Referring to FIGS. 5 and 6, the backlight unit 120 may include the optical layer 123 including substrates 122, at least one light assembly 124, a reflecting sheet 126 and the diffusion plate 129, and the optical sheet 125 positioned on a front surface of the optical layer 123.

The substrates 122 may include a plurality of straps, which extend in a first direction and are separated from one another by a predetermined distance in a second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 maybe formed of at least one of polyethyleneterephthalate (PET), glass, polycarbonate (PC), and silicon. The substrate 122 maybe a printed circuit board (PCB), on which at least one light assembly 124 is mounted.

The light assemblies 124 may be disposed on the substrate 122 at predetermined intervals in the first direction. A diameter of the light assembly 124 may be greater than a width of the substrate 122. Namely, the diameter of the light assembly 124 may be greater than a length of the substrate 122 in the second direction.

The light assembly 124 may be one of a light emitting diode (LED) chip and a LED package having at least one LED chip.

The light assembly 124 may be configured as a colored LED emitting at least one of red, green, and blue light or a white LED. The colored LED may include at least one of a redLED, a greenLED, and a blueLED.

The light source included in the light assembly 124 may be a COB(Chip-On-Board) type. The COB light source may have a configuration, in which the LED chip as the light source is directly coupled to the substrate 122. Thus, the process may be simplified. Further, a resistance may be reduced, and a loss of energy resulting from heat may be reduced. Namely, power efficiency of the light assembly 124 may increase. The COB light source can provide the brighter lighting and may be implemented to be thinner and lighter than a related art.

The reflecting sheet 126 may be positioned at the front surface of the substrate 122. The reflecting sheet 126 may be positioned in an area excluding a formation area of the light assemblies 124 of the substrates 122. Namely, the reflecting sheet 126 may have a plurality of holes 235.

The reflecting sheet 126 may reflect light emitted from the light assembly 124 to a front surface of the reflecting sheet 126. Further, the reflecting sheet 126 may again reflect light reflected from the diffusion plate 129.

The reflecting sheet 126 may include at least one of metal and metal oxide which are a reflection material. The reflecting sheet 126 may include metal and/or metal oxide having a high reflectance, for example, aluminum (Al), silver (Ag), gold (Au), and titanium dioxide ($TiO_2$).

The reflecting sheet 126 may be formed by depositing and/or coating the metal or the metal oxide on the substrate 122. An ink including the metal material may be printed on the reflecting sheet 126. On the reflecting sheet 126, a deposition layer may be formed using a heat deposition method, an evaporation method, or a vacuum deposition method such as a sputtering method. On the reflecting sheet 126, a coating layer and/or a printing layer may be formed using a printing method, a gravure coating method or a silk screen method.

An air gap may be positioned between the reflecting sheet 126 and the diffusion plate 129. The air gap may serve as a buffer capable of widely spreading light emitted from the light assembly 124. A supporter (or support plate) 200 may be positioned between the reflecting sheet 126 and the diffusion plate 129, so as to maintain the air gap.

A resin may be deposited on the light assembly 124 and/or the reflecting sheet 126. The resin may function to diffuse light emitted from the light assembly 124.

The diffusion plate 129 may upwardly diffuse light emitted from the light assembly 124.

The optical sheet 125 may be positioned at a front surface of the diffusion plate 129. A back surface of the optical sheet 125 may be adhered to the diffusion plate 129, and a front surface of the optical sheet 125 may be adhered to the back surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

In other words, the optical sheet 125 may include a plurality of sheets having different functions. For example, the optical sheet 125 may include first to third optical sheets 125*a* to 125*c*. The first optical sheets 125*a* may function as a diffusion sheet, and the second and third optical sheets 125*b* and 125*c* may function as a prism sheet. A number and/or a position of the diffusion sheets and the prism sheets may be changed. For example, the optical sheet 125 may include the first optical sheets 125*a* as the diffusion sheet and the second optical sheet 125*b* as the prism sheet.

The diffusion sheet may prevent light coming from the diffusion plate from being partially concentrated and may homogenize a luminance of the light. The prism sheet may concentrate light coming from the diffusion sheet and may make the concentrated light be vertically incident on the display panel 110.

The coupling unit 125*d* may be formed on at least one of corners of the optical sheet 125. The coupling unit 125*d* may be formed in at least one of the first to third optical sheets 125*a* to 125*c*.

The coupling unit 125*d* may be formed at the corner on the long side of the optical sheet 125. The coupling unit 125*d* formed on the first long side and the coupling unit 125*d* formed on the second long side may be asymmetric. For example, a number and/or a position of the coupling units 125*d* formed on the first long side may be different from a number and/or a position of the coupling units 125*d* formed on the second long side.

Figure 7:
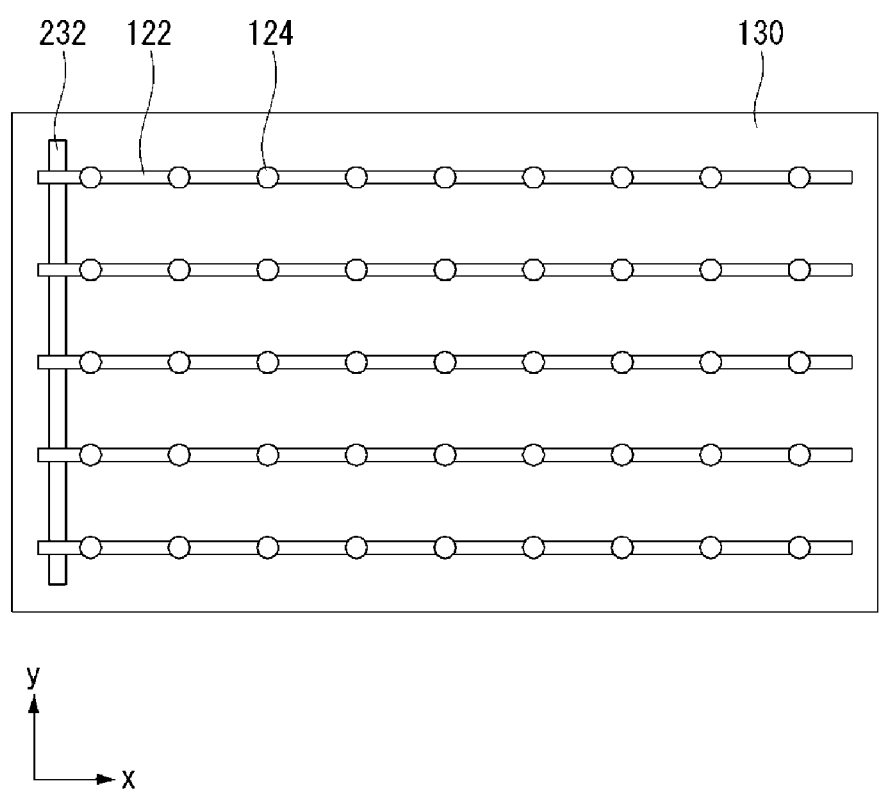

Referring to FIG. 7, the substrates 122 including the plurality of straps, which extend in the first direction and are separated from one another by a predetermined distance in the second direction perpendicular to the first direction, may be provided on the frame 130. One end of each of the plurality of substrates 122 may be connected to a line electrode 232.

The line electrode 232 may extend in the second direction. The line electrode 232 may be connected to the ends of the substrates 122 at predetermined intervals in the second direction. The substrates 122 may be electrically connected to the adaptor through the line electrode 232.

The light assemblies 124 may be mounted on the substrate 122 at predetermined intervals in the first direction. A diameter of the light assembly 124 may be greater than a width of the substrate 122 in the second direction. Hence, an outer area of the light assembly 124 may be positioned beyond a formation area of the substrate 122.

Figure 8:
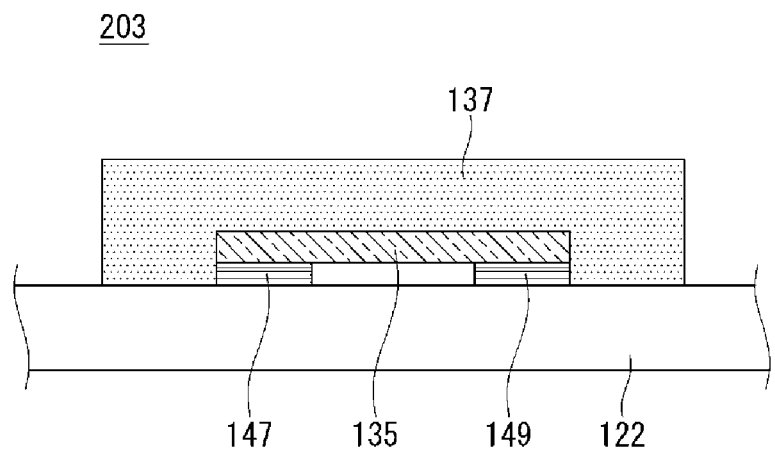
FIGS. 8 and 9 illustrate a light source according to an example embodiment of the invention.
Figure 9:
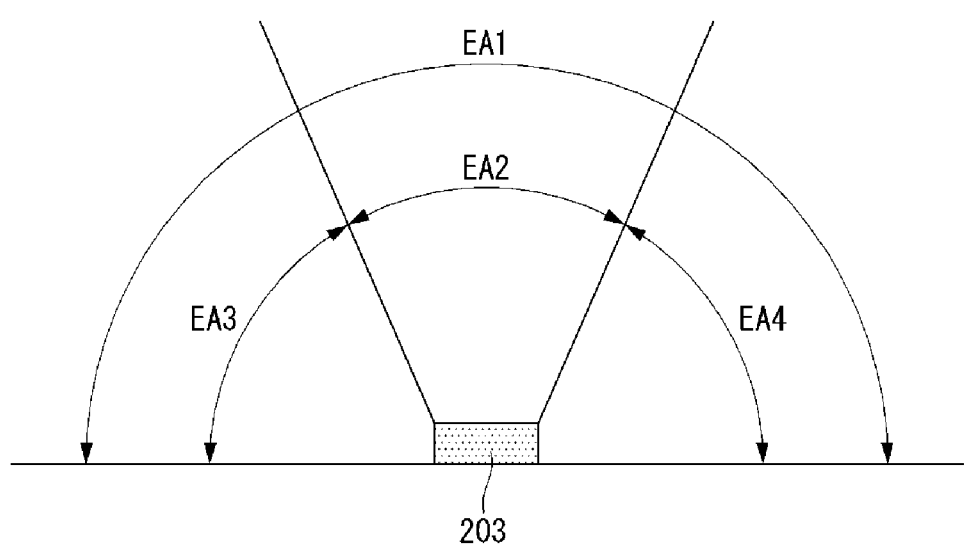

FIGS. 8 and 9 show a light source according to the embodiment of the invention.

As shown in FIG. 8, a light source 203 may be a COB light source. The COB light source 203 may include at least one of an emission layer 135, first and second electrodes 147 and 149, and a fluorescent layer 137.

The emission layer 135 may be positioned on the substrate 122. The emission layer 135 may emit one of red, green, and blue light. The emission layer 135 may include one of Firpic, (CF3ppy)2Ir(pic), 9,10-di(2-naphthy)anthracene(AND), perylene, distyrybiphenyl, PVK, OXD-7, UGH-3(Blue), and a combination thereof.

The first and second electrodes 147 and 149 may be positioned on both sides of a lower surface of the emission layer 135. The first and second electrodes 147 and 149 may transmit an external driving signal to the emission layer 135.

The fluorescent layer 137 may cover the emission layer 135 and the first and second electrodes 147 and 149. The fluorescent layer 137 may include a fluorescent material converting light of a spectrum generated from the emission layer 135 into white light. A thickness of the emission layer 135 on the fluorescent layer 137 may be uniform. The fluorescent layer 137 may have a refractive index of 1.4 to 2.0.

The COB light source 203 according to the embodiment of the invention may be directly mounted on the substrate 122. Thus, the size of the light assembly 124 may decrease.

Because heat dissipation of the light sources 203 is excellent by forming the light sources 203 on the substrate 122, the light sources 203 may be driven at a high current. Hence, a number of light sources 203 required to secure the same light quantity may decrease.

Further, because the light sources 203 are mounted on the substrate 122, a wire bonding process may not be necessary. Hence, the manufacturing cost may be reduced due to the simplification of the manufacturing process.

As shown in FIG. 9, the light source 203 according to the embodiment of the invention may emit light in a first emission range EA1. Namely, the light source 203 may emit light in the first emission range EA1 including a second emission range EA2 of the front side and third and fourth emission ranges EA3 and EA4 of both sides. Thus, the light source 203 according to the embodiment of the invention is different from a related art POB light source emitting light in the second emission range EA2. In other words, the light source 203 according to the embodiment of the invention may be the COB light source, and the COB light source 203 may emit light in a wide emission range including the side.

Because the COB light source 203 emits light even in a direction corresponding to the third and fourth emission ranges EA3 and EA4 of the side, the embodiment of the invention needs to efficiently control light of the side direction. The reflecting sheet according to the embodiment of the invention may control a reflectance of light emitted from the light source 203 in the side direction. Thus, the embodiment of the invention may reduce the non-uniformity of brightness resulting from light of the side direction.

Figure 10:
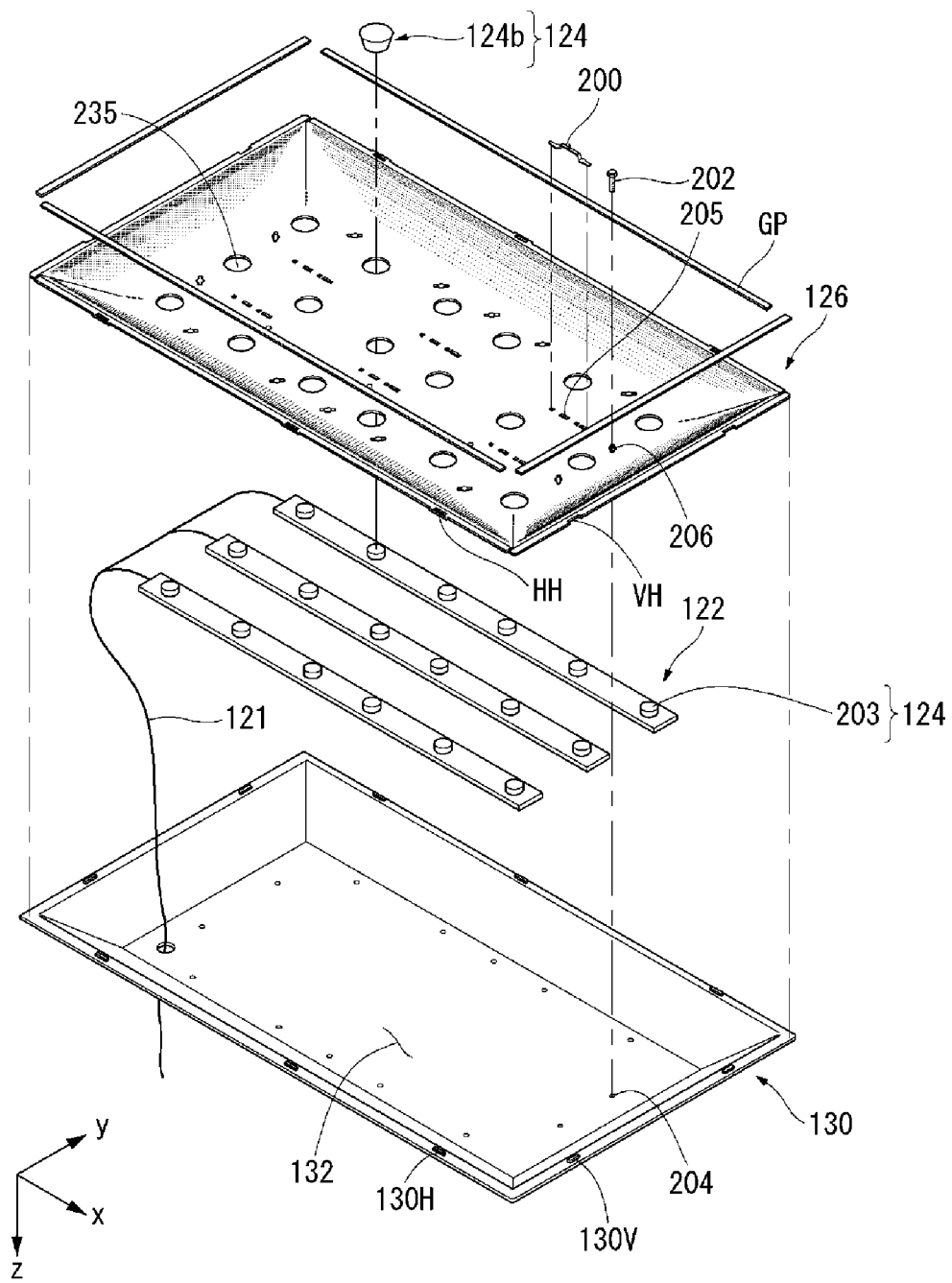
FIG. 10 illustrates a connection relationship between a reflecting sheet and components around the reflecting sheet according to an example embodiment of the invention.

FIG. 10 illustrates a connection relationship between the reflecting sheet and components around the reflecting sheet according to the embodiment of the invention.

As shown in FIG. 10, the reflecting sheet 126 according to the embodiment of the invention may be placed on the frame 130. For example, the reflecting sheet 126 may be coupled to a receiving unit 132 formed inside the frame 130.

The reflecting sheet 126 may include a horizontal coupling unit HH and a vertical coupling unit VH. For example, coupling holes may be formed along a long side and/or a short side of the reflecting sheet 126.

The horizontal coupling unit HH and the vertical coupling unit VH may be inserted into a horizontal protrusion 130H and/or a vertical protrusion 130V formed on the frame 130. A guide panel GP may be formed on the reflecting sheet 126.

The guide panel GP may be formed of plastic material of injection molding or press processed metal material. The guide panel GP may be coupled to the horizontal protrusion 130H and/or the vertical protrusion 130V. When the guide panel GP is coupled to the reflecting sheet 126, the reflecting sheet 126 may be fixed between the frame 30 and the guide panel GP. FIG. 10 shows that the long sides and the short sides of the guide panel GP are separated from one another, as an example. The guide panel GP, which the long sides and the short sides are connected to one another, may be used.

The reflecting sheet 126 placed on the frame 130 may be configured as a three-dimensional shape corresponding to a shape of the receiving unit 132. Even when the reflecting sheet 126 according to the embodiment of the invention has the three-dimensional shape, the reflecting sheet 126 can provide an optimum reflection effect. For example, the reflecting sheet 126 can uniformly reflect light throughout its entire area.

The reflecting sheet 126 may constitute a portion of the backlight unit 120 (refer to FIG. 5). The substrate 122, on which the light sources 203 are mounted, may be positioned between the reflecting sheet 126 and the frame 130.

The plurality of substrates 122 may be arranged in the horizontal direction and/or the vertical direction. The substrates 122 may be connected to signal lines 121 connected to a controller, etc., of the display device 100. The signal lines 121 may be connected to the substrates 122 through holes formed in the frame 130.

The reflecting sheet 126 may include a plurality of lens holes 235. The plurality of lens holes 235 may correspond to the light sources 203 on the substrate 122. For example, the plurality of lens holes 235 may be arranged in the horizontal direction and/or the vertical direction correspondingly to the light sources 203. A lens 124b may be inserted into the lens hole 235. For example, the lens 124b may be coupled to the light source 203 through the lens hole 235.

The reflecting sheet 126 may include a plurality of support holes (or support plate holes) 205. A supporter 200 may be coupled to the support hole 205. The supporter 200 may support the optical sheet 125 and/or the diffusion plate 129 positioned in front of the reflecting sheet 126. Namely, the reflecting sheet 126 may be separated from the optical sheet 125 and/or the diffusion plate 129 at a predetermined distance.

The reflecting sheet 126 may include a plurality of fixing pin holes 206. A fixing pin 202 may be coupled to the fixing pin hole 206. Also, the fixing pin 202 may be coupled to a frame hole 204 formed in the frame 130. Thus, the fixing pin 202 may fix the reflecting sheet 126 to the frame 130.

Figure 11:
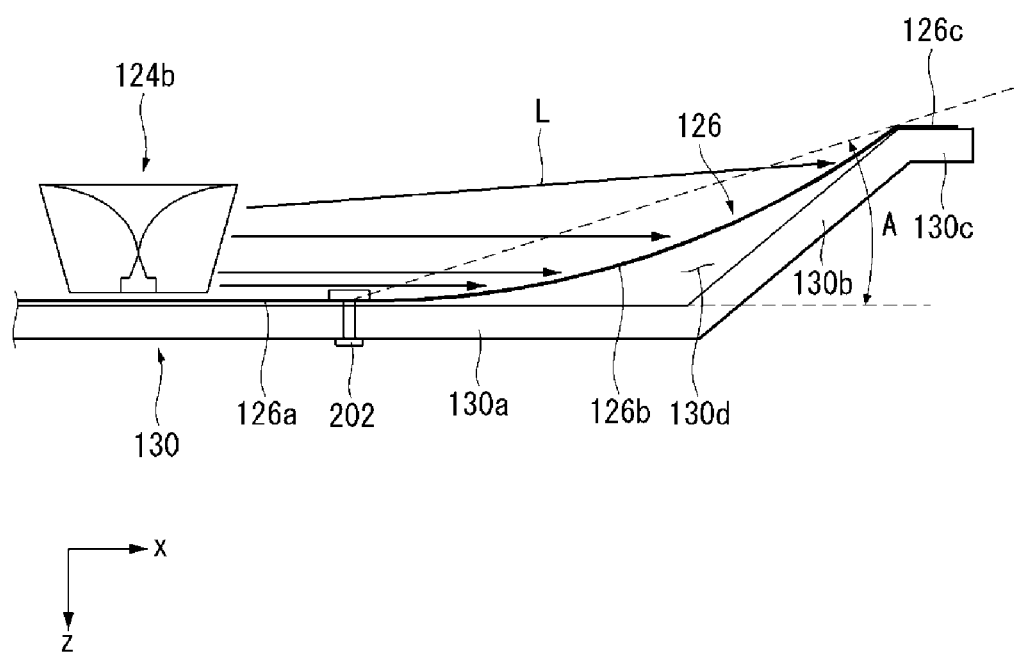
FIGS. 11 to 13 illustrate configuration of a reflecting sheet according to an example embodiment of the invention.
Figure 12:
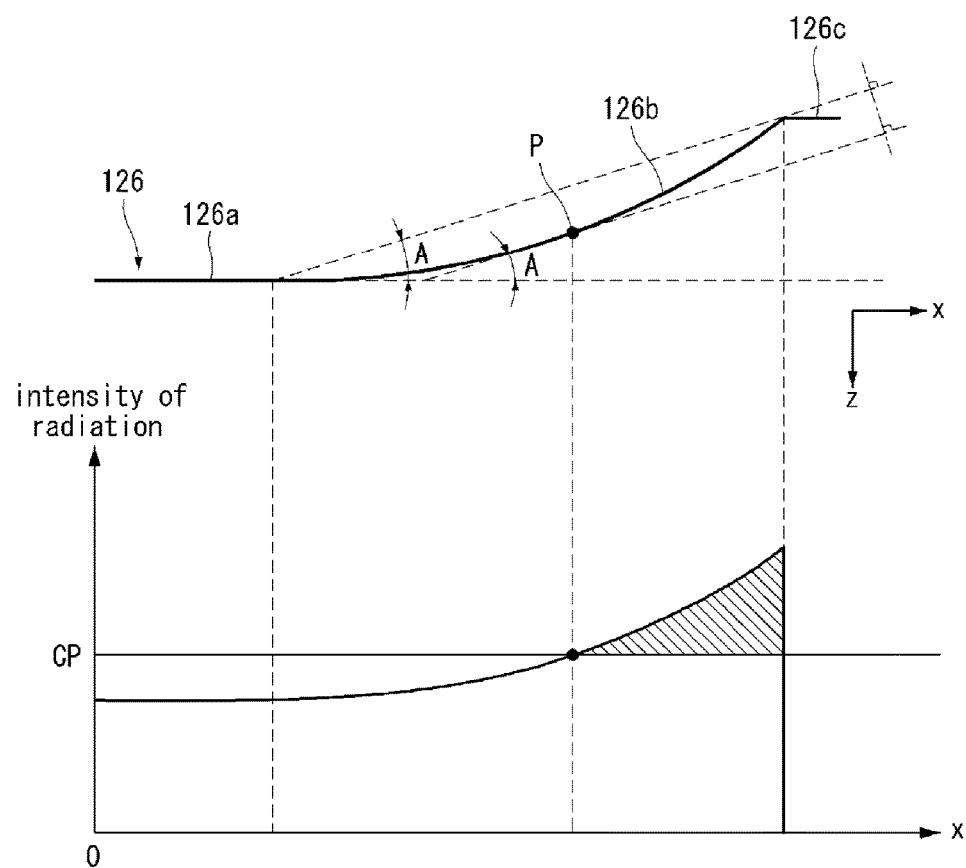
Figure 13:
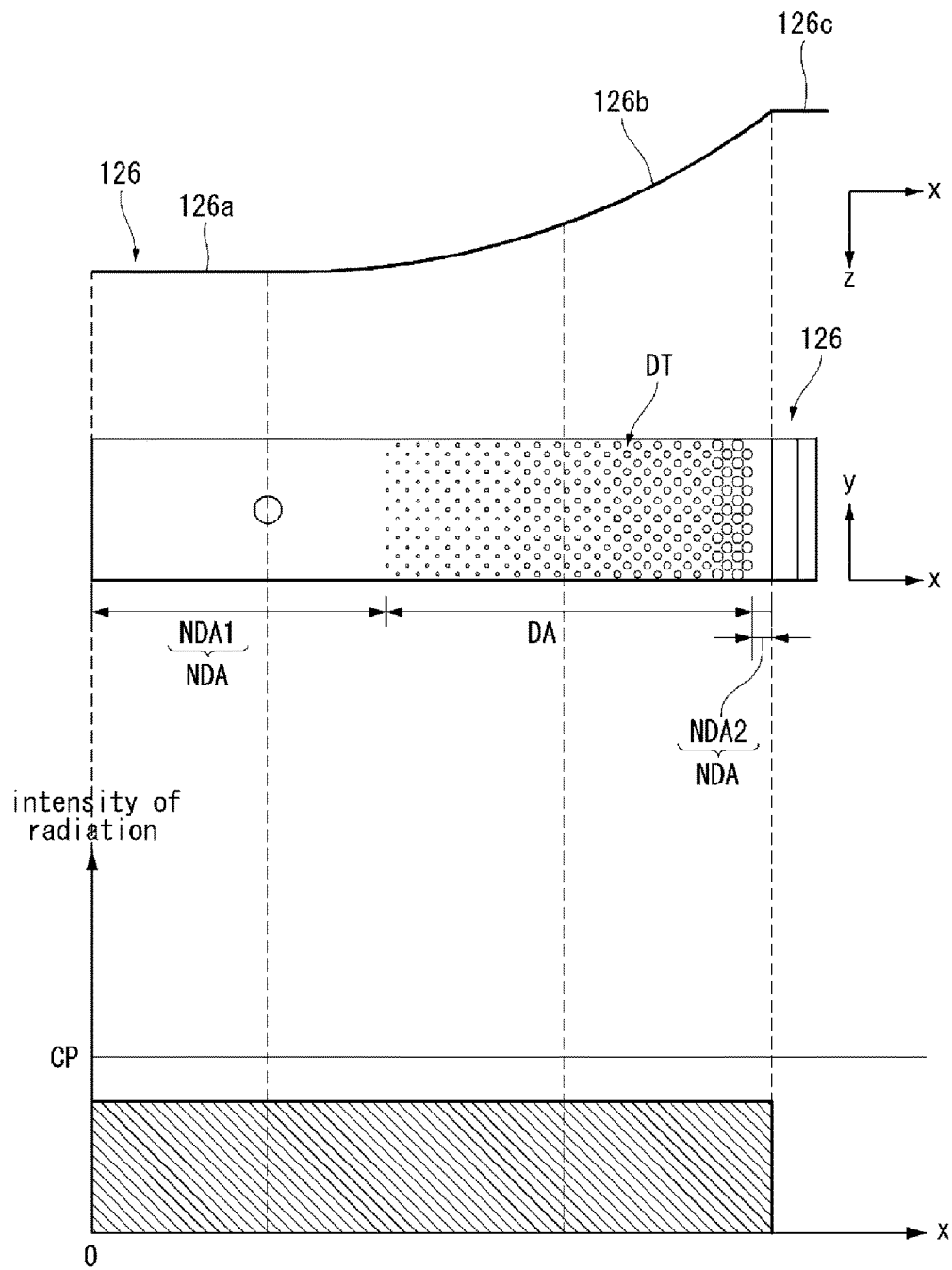

FIGS. 11 to 13 illustrate configuration of the reflecting sheet according to the embodiment of the invention.

As shown in FIGS. 11 to 13, the reflecting sheet 126 according to the embodiment of the invention may be placed in an inner area of the frame 130. The reflecting sheet 126 placed on the frame 130 may have the three-dimensional shape corresponding to a shape of the frame 130.

As shown in FIG. 11, the frame 130 may include first to third frame areas 130a to 130c.

The first frame area 130a may be a bottom surface of the frame 130. The second frame area 130b may be substantially flat. Namely, the second frame area 130b may be a surface positioned on an X-Y plane of the display device 100.

The second frame area 130b may be a sidewall surface extended upwardly from the first frame area 130a. The second frame area 130b may extend in a direction parallel to a Z-axis direction or a direction inclined to the Z-axis direction. The receiving unit 132 (refer to FIG. 10) may be formed inside the frame 130 by the second frame area 130b serving as a sidewall of the frame 130.

The third frame area 130c may be a surface extended from the second frame area 130b in an X-axis direction. The third frame area 130c may be substantially parallel to the first frame area 130a. Namely, the third frame area 130c may be a flat surface in the same manner as the first frame area 130a at a height level different from the first frame area 130a by the second frame area 130b.

The third frame area 130c may include a protruding area. The third frame area 130c may be coupled to a protrusion formed through a separate process. The protruding area and/or the protrusion of the third frame area 130c may be coupled to the reflecting sheet 126. For example, the protruding area and/or the protrusion of the third frame area 130c may be coupled to a third sheet area 126c of the reflecting sheet 126. The protruding area and/or the protrusion of the third frame area 130c may be coupled to the optical sheet 125 (refer to FIG. 5).

The reflecting sheet 126 may be coupled to an area formed by the first to third frame areas 130a to 130c of the frame 130. For example, the reflecting sheet 126 may be coupled to the first frame area 130a through the fixing pin 202. When a portion of the reflecting sheet 126 is coupled to the first frame area 130a through the fixing pin 202, the portion of the reflecting sheet 126 may naturally contact the frame 130.

When the reflecting sheet 126 is coupled to the frame 130 through the fixing pin 202, the shape of the reflecting sheet 126 may be naturally changed depending on the shape of the frame 130. Namely, a naturally rounded second sheet area 126b of the reflecting sheet 126 may be formed. Thus, a separate process for forming a chamfer of the reflecting sheet 126 may not be necessary, and workability may be improved.

The reflecting sheet 126 may include first to third sheet areas 126a to 126c. Namely, an area of the reflecting sheet 126 may be divided depending on whether or not the reflecting sheet 126 and the frame 130 contact each other. For example, the area of the reflecting sheet 126 may be divided into a contact area contacting the frame 130 and a non-contact area not contacting the frame 130.

The area of the reflecting sheet 126 may be divided into the first sheet area 126a and the second sheet area 126b by the fixing pin 202. In other words, the second sheet area 126b may be an area between the fixing pin 202 and a portion contacting the third frame area 130c, Namely, the first sheet area 126a and the second sheet area 126b may be determined depending on whether or not the reflecting sheet 126 contacts the first frame area 130a of the frame 130. The second sheet area 126b may be naturally separated from the frame 130 by properties and elasticity of the reflecting sheet 126. For example, when the first sheet area 126a is coupled to the frame 130 by the fixing pin 202, the second sheet area 126b may naturally form a curved surface by its own weight and may be separated from the frame 130. A separation space 130d may be formed between the second sheet area 126b and the frame 130. An angle formed by the second sheet area 126b of the reflecting sheet 126 and the bottom surface of the frame 130 may gradually increase. Namely, in the non-contact area of the reflecting sheet 126, the reflecting sheet 126 may have a two-dimensional curve shape. Thus, the second sheet area 126b may be separated from the frame 130 at a predetermined angle.

The third sheet area 126c may be placed in the third frame area 130c. The third sheet area 126c may be coupled to the third frame area 130c. Alternatively, the third sheet area 126c may be naturally positioned on the third frame area 130c. Namely, the third sheet area 126c may contact the third frame area 130c by elastic force of the Z-axis direction resulting from the rounded second sheet area 126b.

Light L may be emitted through the lens 124b. Namely, light generated in the light source 203 may be emitted to the outside through the lens 124b. The light L emitted through the lens 124b may travel through various paths. For example, a portion of the light L may travel through a path of the side direction of the lens 124b.

The portion of the light L in the path of the side direction may travel toward the second sheet area 126b. At least a portion of light generated in the light source 203 may be totally reflected inside the lens 124b and may travel toward the second sheet area 126b. In this instance, an amount of light L upwardly travelling in the second sheet area 126b may be more than an amount of light L downwardly travelling in the second sheet area 126b. In other words, an amount and/or a density of light L transferred to the reflecting sheet 126 may be non-uniform. When the amount and/or the density of the light L is not uniform, a viewer watching the display device 100 may perceive non-uniformity of the amount and/or the density of the light L. For example, when an amount of light L incident on an upper portion of the second sheet area 126b is more than an amount of light L incident on a lower portion of the second sheet area 126b, a corresponding area may be recognized as being brighter than other areas because of the light L reflected from the upper portion of the second sheet area 126b.

As shown in FIG. 12, an angle formed by an extension line from a boundary between the first sheet area 126a and the second sheet area 126b to a boundary between the second sheet area 126b and the third sheet area 126c and two straight lines parallel to the X-axis direction may be called "A". An inclined angle of the second sheet area 126b using an intersection point P between the second sheet area 126b and a straight line of the angle A as a starting point may increase. Namely, an angle of the second sheet area 126b passing the intersection point P in the X-axis direction may sharply increase.

Because the angle of the second sheet area 126b passing the intersection point P increases, a density of the light L emitted from the lens 124b (refer to FIG. 11) per unit area may further increase. Thus, a corresponding portion may be seen as being brighter than other portions. As a result, the viewer may feel that the light is not uniform. The display device 100 according to the embodiment of the invention can make light be uniformly reflected from the reflecting sheet 126. Hence, the viewer cannot feel or can feel less the non-uniformity of the light.

As shown in FIG. 13, in the display device 100 according to the embodiment of the invention, dots DT may be formed in at least a portion of the reflecting sheet 126.

The dot DT may be an area having a pattern different from other areas. The dot DT may be an area of uneven portions (or concave-convex portions) formed on the reflecting sheet 126. The dot DT may be an area, in which at least a portion of the reflecting sheet 126 is colored. For example, the dot DT may be an area of a relatively dark color. For example, the dot DT may be a black or gray area. The dot DT may be an area, in which the uneven portion and the colored portion are mixed with each other. The dot DT may have a geometric shape, in which there is a difference in at least one of a shape, a size, a location, and a color. For example, the dot DT may be one of various shapes including a circle, an oval, a rectangle, a rod, a triangle, etc., formed on the reflecting sheet 126 and/or a combination of the various shapes.

The dots DT may affect a reflectance of a corresponding area. Namely, the dots DT may change a reflectance of light. For example, the reflectance of light may be reduced depending on at least one of a shape, a size, a location, and a color of the dot DT. The plurality of dots DT may gather (or arranged) and form a dot area DA.

The dot area DA may be a gathering (or arranging) of the dots DT. Namely, the dot area DA may be a formation area of the plurality of dots DT, which are the same as or different from one another in at least one of a shape, a size, a location, and a color. For example, the dot area DA may be formed in at least a portion of the second sheet area 126b. As described above, a density of light per unit area in the second sheet area 126b may be high because of the inclined shape of the second sheet area 126b. The dot area DA may change a reflectance of light incident on the second sheet area 126b. In other words, a density of incident light per unit area is high, but a density of reflected light per unit area may decrease. Thus, a phenomenon, in which a contrast of a portion corresponding to the second sheet area 126b is different from a contrast of other portions, may be prevented. Namely, light can be uniformly reflected from the entire reflecting sheet 126 because of the dot area DA. The dots DT constituting the dot area DA may be divided into a plurality of groups having different attributes. For example, a formation area of dots having a first attribute may be called a first area, and a formation area of dots having a second attribute may be called a second area. Hereinafter, the dot area DA may be displayed by changing the color, the density, etc., of the reflecting sheet 126, and areas having the different colors, densities, etc., may be formation areas of dots having different attributes even if a separate explanation is not given. For example, dots having different attributes may be disposed in an area with a first color and an area with a second color. Namely, dots, which are different from one another in at least one of the size, the density, the color, and the interval, may be disposed in different areas.

The reflecting sheet 126 may further include anon-dot area NDA. The non-dot area NDA may be an area, in which there is no dot DT. The non-dot area NDA may be positioned in various areas of the reflecting sheet 126. For example, the non-dot area NDA may include first and second non-dot areas NDA1 and NDA2.

A width of the non-dot area NDA may be greater than a distance between adjacent dots. Namely, the width of the non-dot area NDA in a direction from the first sheet area 126a to the third sheet area 126c may be greater than a distance between two dots adjacent to the non-dot area NDA. The width of the non-dot area NDA may be equal to or greater than 2 mm.

The second non-dot area NDA2 may be positioned at a boundary between the second sheet area 126b and the third sheet area 126c. The second non-dot area NDA2 may be positioned in the second sheet area 126b at the boundary between the second sheet area 126b and the third sheet area 126c.

The second non-dot area NDA2 may be an uppermost area of the second sheet area 126b and thus may be close to the optical sheet 125 and/or the diffusion plate 129 positioned in front of the reflecting sheet 126. Hence, if the dot DT exists in the second non-dot area NDA2, the user of the display device 100 may observe the dot DT. Thus, the dot DT may not exist in the second non-dot area NDA2.

FIGS. 14 to 17 illustrate a dot distribution of the reflecting sheet according to the embodiment of the invention.

As shown in FIGS. 14 to 17, the dots DT of the reflecting sheet 126 according to the embodiment of the invention may be disposed in various shapes.

Figure 14:
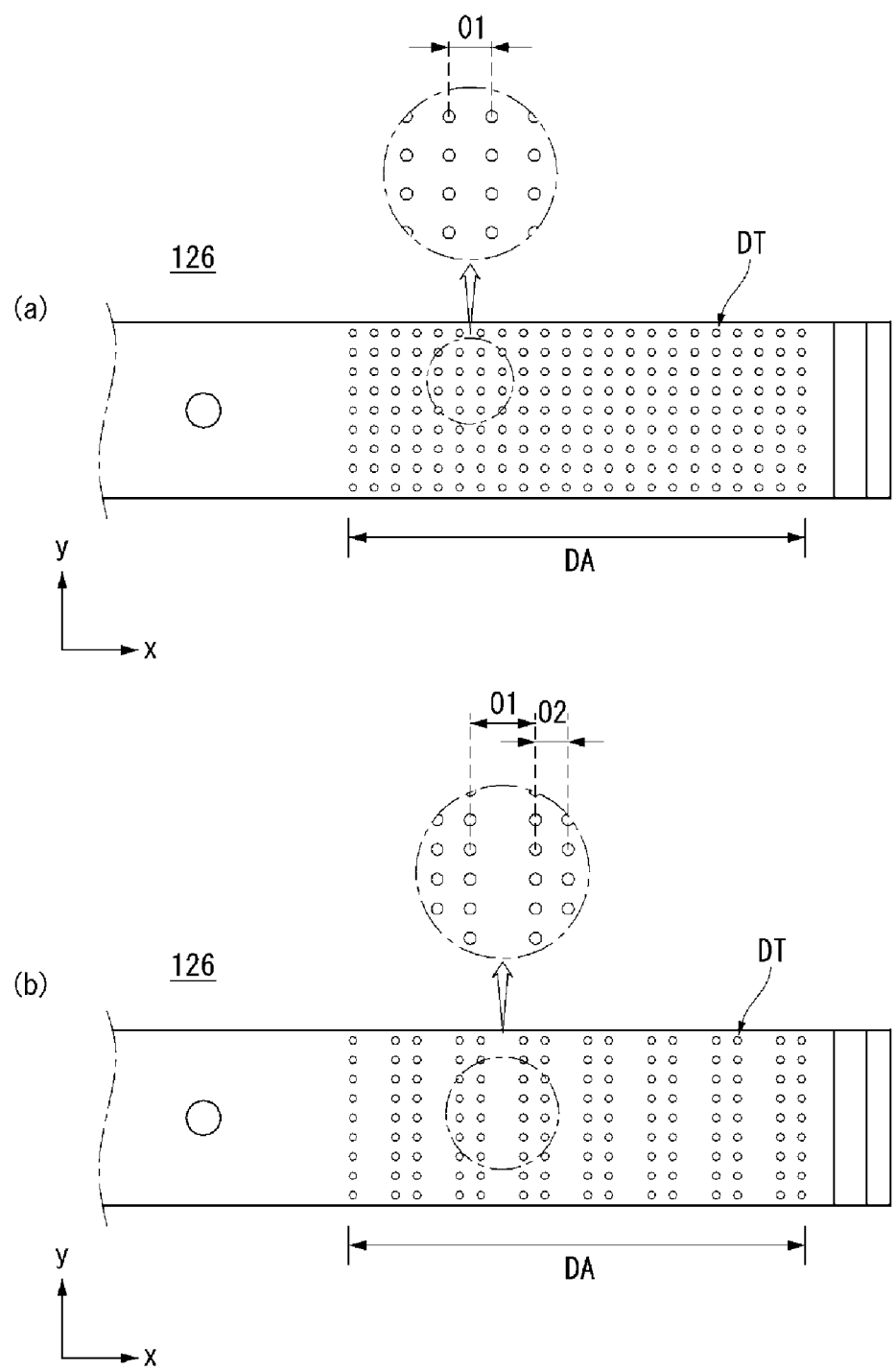
FIGS. 14 to 17 illustrate a dot distribution of a reflecting sheet according to an example embodiment of the invention.

As shown in (a) of FIG. 14, the dots DT may be disposed in the dot area DA. The adjacent dots DT may be separated from each other by a first distance O1. Namely, the dots DT may be disposed at regular intervals of the first distance O1.

The distance between the dots DT may affect the reflectance of the reflecting sheet 126. For example, when the distance between the dots DT decreases, the reflectance may decrease.

As shown in (b) of FIG. 14, the adjacent dots DT may be separated from each other by the first distance O1, and the adjacent dots DT may be separated from each other by a second distance O2. Namely, a distance between the dots DT may not be uniform As shown in (a) of FIG. 15, the dot area DA may be divided into a plurality of areas. For example, the dot area DA may be divided into a first area P1 and a second area P2. An attribute of dots DT included in the first area P1 may be different from an attribute of dots DT included in the second area P2. For example, at least one of a size, a density, and a color of a first dot DT1 in the first area P1 may be different from at least one of a size, a density, and a color of a second dot DT2 in the second area P2.

The second area P2 may be positioned further outside than the first area P1. Namely, the second area P2 may be an area close to the third sheet area 126c. The second dot DT2 of the second area P2 may be larger than the first dot DT1 of the first area P1. Thus, a reflectance of the second area P2 may be less than a reflectance of the first area P1.

Figure 15:
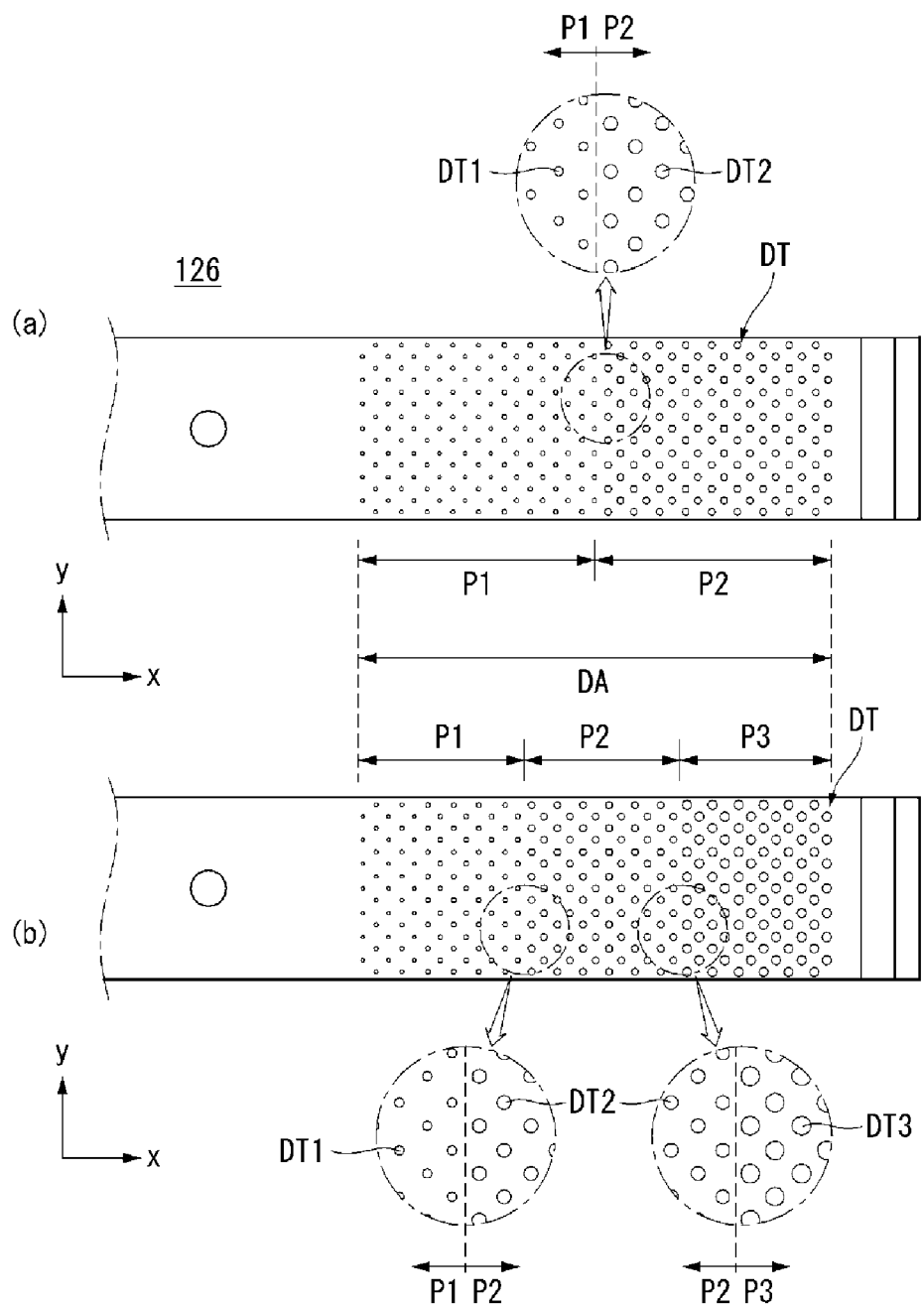

As shown in (b) of FIG. 15, the dot area DA may be divided into a plurality of areas. For example, the dot area DA may be divided into first to third areas P1 to P3. First to third dots DP1 to DP3 of the first to third areas P1 to P3 may have different attributes. For example, the second dot DT2 may be larger than the first dot DT1, and the third dot DT3 may be larger than the second dot DT2. Alternatively, the first to third dots DP1 to DP3 have the same size, but a density of the first area P1 may be different from a density of the second area P2, and a density of the second area P2 may be different from a density of the third area P3. For example, the density of the first area P1 may be less than the density of the second area P2, and the density of the second area P2 may be less than the density of the third area P3.

Figure 16:
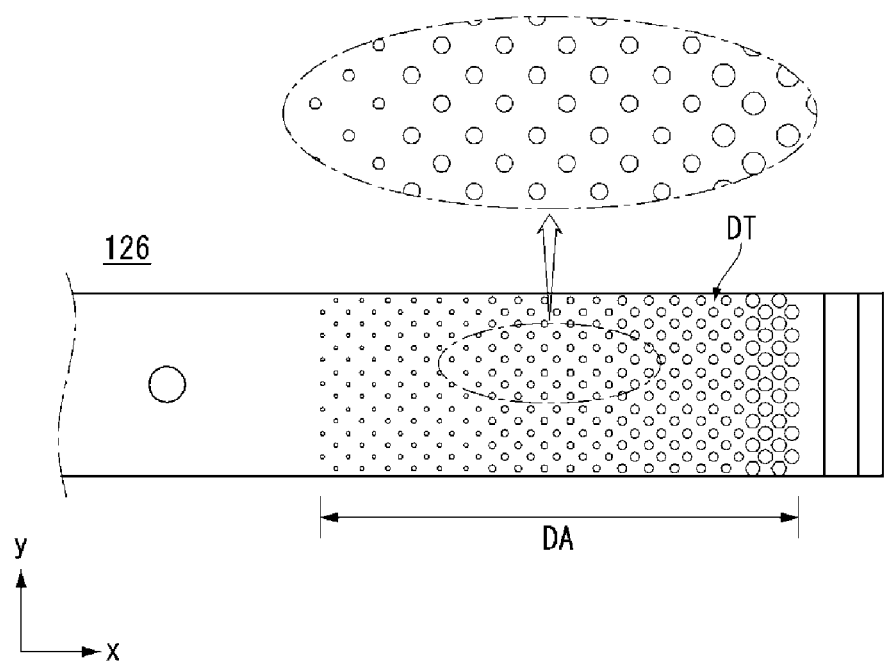

As shown in FIG. 16, the dot area DA may not be divided into a plurality of areas. However, dots DT included in the dot area DA may be different from each other in at least one of a size, a density, and a color. For example, as the dot DT goes along the X-axis direction, the size of the dot DT may gradually increase. Namely, an attribute of the dot DT including at least one of the size, the density, and the color may gradually change.

Figure 17:
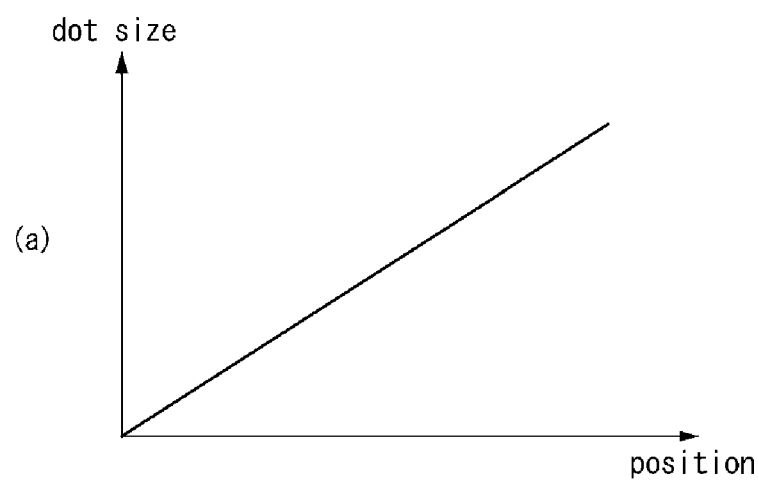
Figure 17:
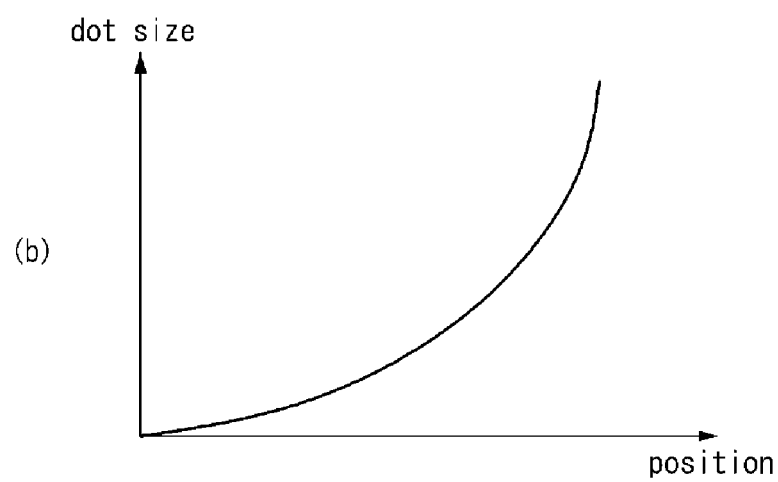

As shown in (a) of FIG. 17, a size of the dot DT may gradually change depending on a location.

As shown in (b) of FIG. 17, a size of the dot DT may sharply change depending on a location. For example, the size of the dot DT may be changed in a curve shape of a quadratic function.

FIGS. 18 to 25 illustrate configuration related to a lens hole of a reflecting sheet according to an example embodiment of the invention.

As shown in FIGS. 18 to 25, the reflecting sheet 126 according to the embodiment of the invention may include the lens hole 235 of various shapes and/or various dispositions capable of controlling a reflection amount of light.

Figure 18:
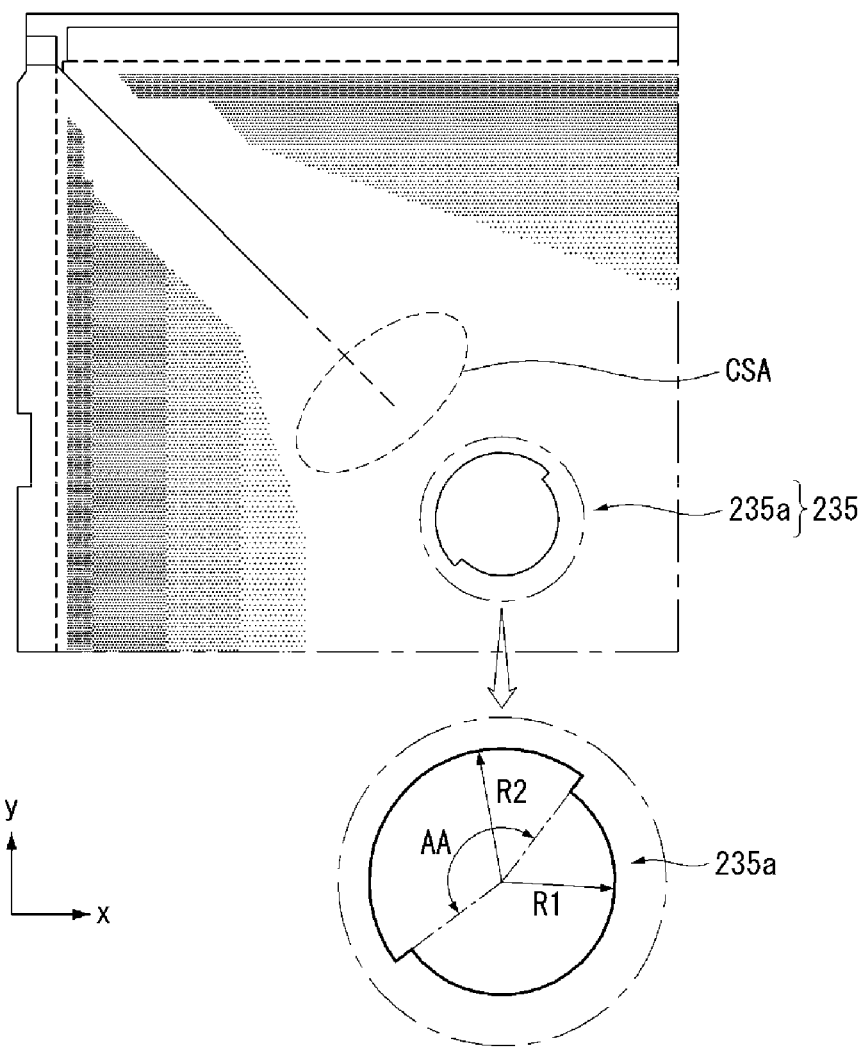
FIGS. 18 to 25 illustrate configuration related to a lens hole of a reflecting sheet according to an example embodiment of the invention.

As shown in FIG. 18, at least one of the lens holes 235 may include a first lens hole 235a.

The first lens hole 235a may not have a circular shape (or a perfectly circular shape). The first lens hole 235a may have a shape, in which a radius is changed. The first lens hole 235a may have a shape, in which a radius is successively changed. For example, the first lens hole 235a of an oval shape may be used. The first lens hole 235a may have a shape, in which a radius is non-successively changed. For example, the first lens hole 235a may have a combination shape of a circle of a first radius R1 and a circle of a second radius R2. The second radius R2 may be an area corresponding to an angle AA. The angle AA may be less than 180 degrees. Namely, the area corresponding to the angle AA may have a fan shape of the second radius R2. In other words, a width of the area corresponding to the angle AA may be less than widths of other areas. In other words, the first lens hole 235a may include a linear area and a curved area. For example, the first lens hole 235a may include a curved area of the first and second radii R1 and R2 and a linear area connecting the first and second radii R1 and R2.

As described above, the second radius R2 may be greater than the first radius R1. Thus, a portion of light emitted through the first lens hole 235a may be emitted from the area corresponding to the angle AA to the rear of the reflecting sheet 126. A total amount of light reflected onto the front of the reflecting sheet 126 by the reflecting sheet 126 may decrease by an amount of light emitted to the rear of the reflecting sheet 126.

An area corresponding to the second radius R2 of the first lens hole 235a may face a chamber area CSA. Namely, the area corresponding to the second radius R2 of the first lens hole 235a may face an outer peripheral of the reflecting sheet 126. In other words, the area corresponding to the second radius R2 of the first lens hole 235a may face the second sheet area 126b (refer to FIG. 13). As described above, because a portion of light is emitted to the rear of the reflecting sheet 126 by the second radius R2, an influence of the first lens hole 235a on the chamber area CSA may be less than an influence of the general lens hole 235. Thus, the chamber area CSA may be prevented from being brighter than other area.

Figure 19:
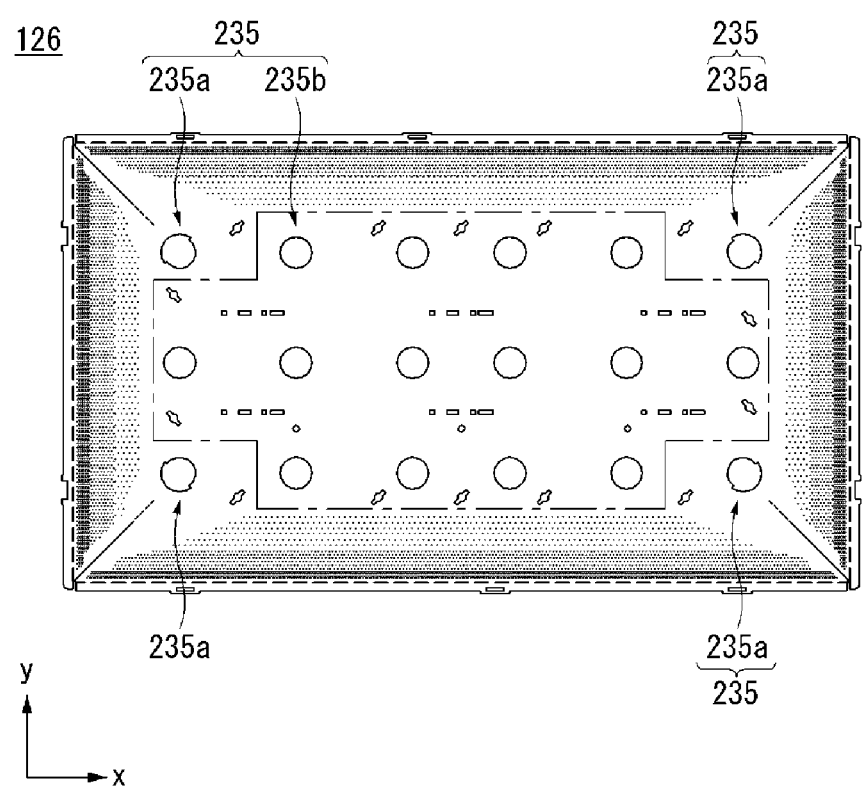

As shown in FIG. 19, the lens hole 235 may include a first lens hole 235a, of which a radius is changed, and a circular second lens hole 235b.

The first lens hole 235a may be positioned on the upper, left, right, and lower sides of the disposed lens holes 235. As described above, the disposition of the first lens hole 235a may prevent the upper, left, right, and lower sides of the lens hole 235 from being brighter than other area.

Figure 20:
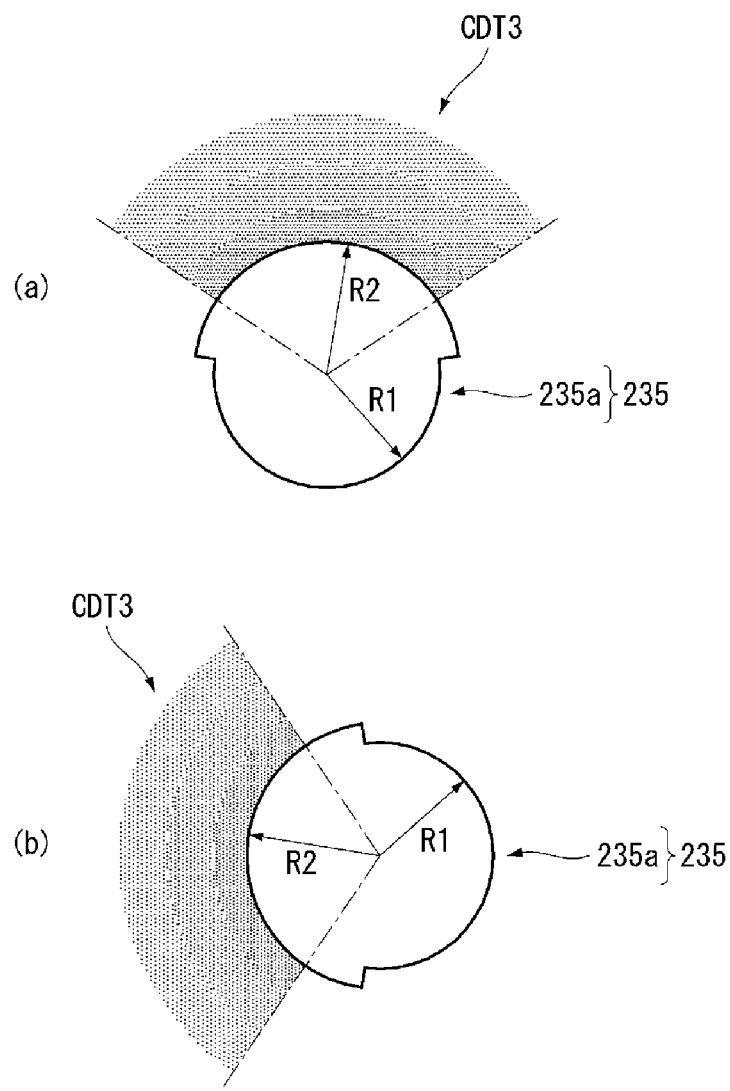

As shown in (a) of FIG. 20, a third ring-shapeddot area CDT3 may be formed in a first lens hole 235 having an overlap shape of circles each having a different radius. For example, the third ring-shapeddot area CDT3 may be formed in a circle having a large second radius R2. For example, the third ring-shapeddot area CDT3 may be formed in at least a portion of the circle having the second radius R2.

As shown in (b) of FIG. 20, when the shape of the first lens hole 235 is changed, a location of the third ring-shapeddot area CDT3 may be changed in accordance with the first lens hole 235.

The third ring-shapeddot area CDT3 shown in (a) of FIG. 20 may be different from the third ring-shapeddot area CDT3 shown in (b) of FIG. 20. For example, a size of the third ring-shapeddot area CDT3 shown in (a) of FIG. 20 may be different from a size of the third ring-shapeddot area CDT3 shown in (b) of FIG. 20. For example, the size of the third ring-shapeddot area CDT3 shown in (a) of FIG. 20 may be larger than the size of the third ring-shapeddot area CDT3 shown in (b) of FIG. 20. The third ring-shapeddot area CDT3 shown in (a) of FIG. 20 may be a dot area corresponding to the horizontal dot area HDA, and the third ring-shapeddot area CDT3 shown in (b) of FIG. 20 may be a dot area corresponding to the vertical dot area VDA. Namely, the size of the third ring-shapeddot area CDT3 formed around the lens hole adjacent to the horizontal dot area HDA may be different from the size of the third ring-shapeddot area CDT3 formed around the lens hole adjacent to the vertical dot area VDA.

The dots included in the third ring-shapeddot area CDT3 may be configured in various combinations. For example, the dots of the third ring-shapeddot area CDT3 may have the same size. For example, the dots of the third ring-shapeddot area CDT3 may include at least two different kinds of dots. For example, as the dot is far away from the lens hole 235, the size of the dot may decrease or increase. For example, a size and/or a kind of the dot in one portion of the third ring-shapedot area CDT3 may be different from a size and/or a kind of the dot in another portion of the third ring-shapeddot area CDT3.

Figure 21:
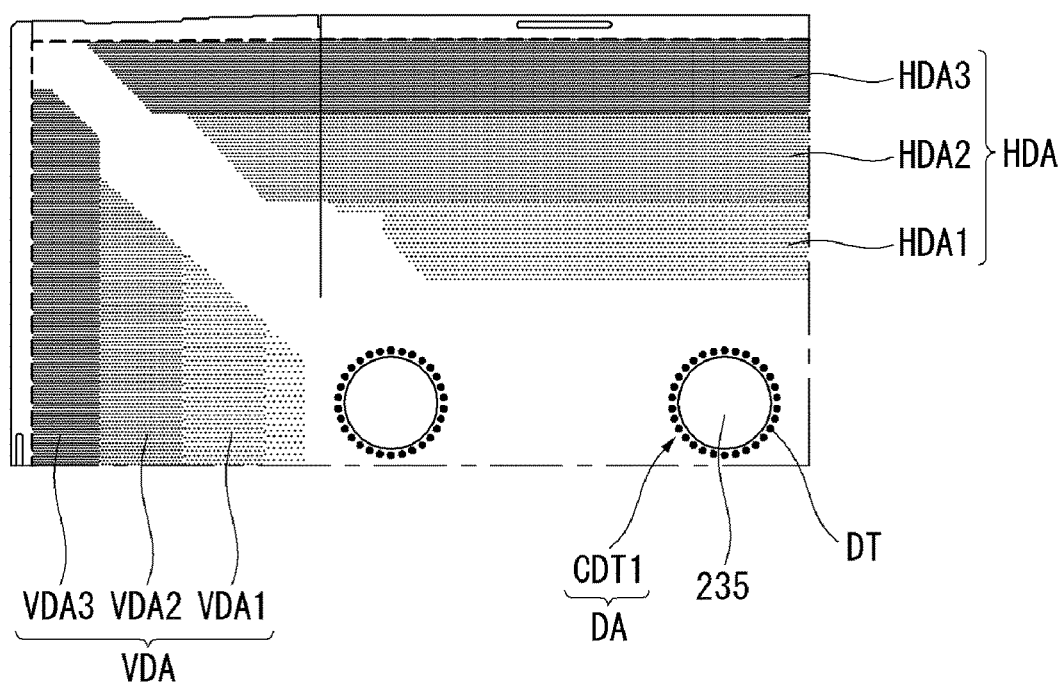

As shown in FIG. 21, the dot area DA may be formed in various shapes. Namely, the dot area DA of the various shapes may be configured so that the reflecting sheet 126 uniformly reflects light. For example, the dot area DA may be formed around the lens hole 235. For example, the dot area DA may be formed in at least a partial area around the lens hole 235. For example, the dot area DA may have the shape surrounding the lens hole 235. Namely, a first circular dot area CDT1 may be formed.

The first ring-shapeddot area CDT1 may have the shape surrounding the lens hole 235. For example, the first ring-shapeddot area CDT1 may have the shape, in which the dots DT of the same size and/or the same shape surround the lens hole 235. For example, the first ring-shapeddot area CDT1 may have the shape, in which the dots DT, of which at least a partial size and/or shape is different, surround the lens hole 235.

A reflectance of a corresponding area may be changed by the first ring-shapeddot area CDT1. For example, a reflectance of a formation area of the first ring-shapeddot area CDT1 may be reduced. Thus, the first ring-shapeddot area CDT1 may be formed around a specific lens hole 235, which needs to reduce the reflectance.

The horizontal dot area HDA and/or the vertical dot area VDA may include a plurality of areas, in which attributes of the dots are different from one another. For example, the horizontal dot area HDA may include first to third horizontal dot areas HDA1 to HDA3, and the vertical dot area VDA may include first to third vertical dot areas VDA1 to VDA3. There may be a difference between the dots of the areas in at least one of a size, an interval, a density, and a color of the dot. For example, the size of the dot in the first horizontal dot area HDA1 may be less than the size of the dot in the second horizontal dot area HDA2, and the size of the dot in the second horizontal dot area HDA2 may be less than the size of the dot in the third horizontal dot area HDA3, or vice versa. The configuration of the first to third horizontal dot areas HDA1 to HDA3 may be equally applied to the first to third vertical dot areas VDA1 to VDA3.

Figure 22:
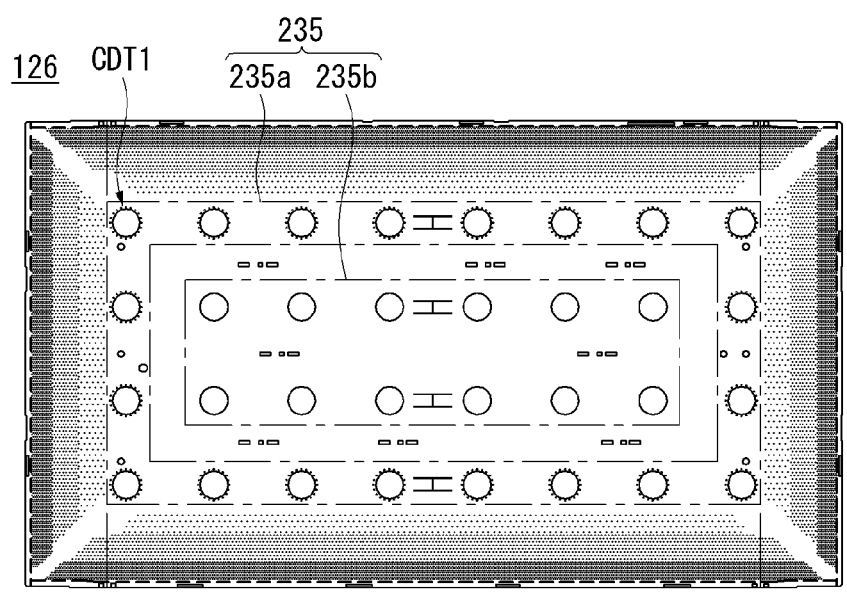

As shown in FIG. 22, the reflecting sheet 126 may include a plurality of lens holes 235. The first ring-shapeddot area CDT1 may be formed in a specific lens hole 235 among the plurality of lens holes 235. For example, the plurality of lens holes 235 may include a first lens hole 235a, in which the first ring-shapeddot area CDT1 is formed, and a second lens hole 235b, in which the first ring-shapeddot area CDT1 is not formed. The first lens hole 235a having the first ring-shapeddot area CDT1 may be the lens hole 235 positioned on the outside among the plurality of lens holes 235a. Namely, the first ring-shapeddot area CDT1 may be formed in the outermost lens hole 235. This may be because the first lens hole 235a positioned on the outside is close to the bending second sheet area 126b (refer to FIG. 13) of the reflecting sheet 126. Namely, the first ring-shapeddot area CDT1 may be formed in the first lens hole 235a, so as to prevent an excessively large amount of light from being reflected from the second sheet area 126b.

Figure 23:
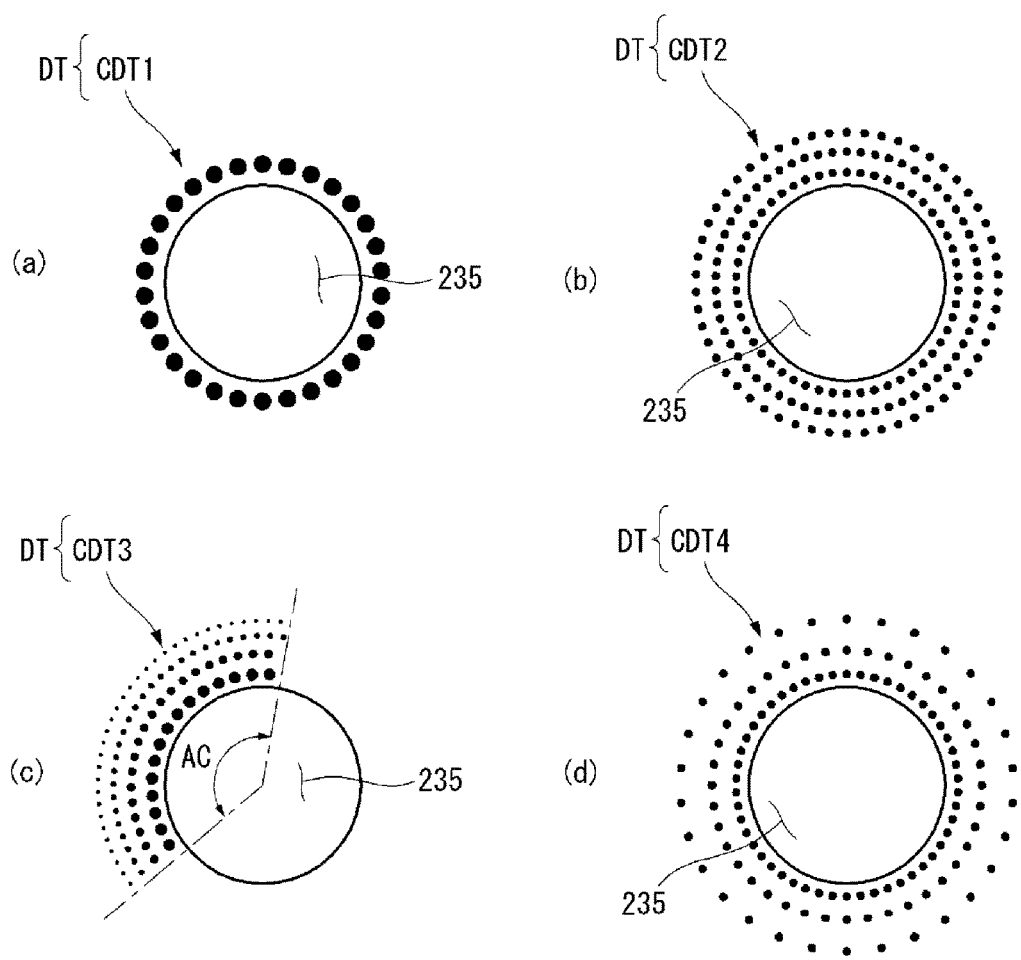

As shown in (a) of FIG. 23, a first ring-shapeddot area CDT1 may be formed around the lens hole 235. The first ring-shapedot area CDT1 may be dots DT surrounding the lens hole 235. The first ring-shapeddot area CDT1 may be dots DT surrounding the lens hole 235 one time. The dots DT constituting the first ring-shapeddot area CDT1 may have the same size and/or the same shape. Alternatively, at least a portion of the dots DT constituting the first ring-shapeddot area CDT1 may have different sizes and different shapes. For example, a size of the dot DT positioned in the outside direction of the reflecting sheet 126 may be greater than a size of the dot DT positioned in the inside direction of the reflecting sheet 126.

As shown in (b) of FIG. 23, a second ring-shapeddot area CDT2 may be formed around the lens hole 235. The second ring-shapeddot area CDT2 may be dots DT surrounding the lens hole 235 several times (several loops or nested). This is a difference between the first ring-shapeddot area CDT1 surrounding the lens hole 235 one time and the second ring-shapeddot area CDT2.

As shown in (c) of FIG. 23, a third ring-shapeddot area CDT3 may be formed around the lens hole 235. The third ring-shapeddot area CDT3 may be formed around a predetermined portion of the lens hole 235. For example, the third ring-shapeddot area CDT3 may be formed in a portion corresponding to an angle AC in the lens hole 235. The third ring-shapeddot area CDT3 may surround the portion corresponding to the angle AC one time or several times.

As shown in (d) of FIG. 23, a fourth ring-shapeddot area CDT4 may be formed around the lens hole 235. A density of dots of the fourth ring-shapeddot area CDT4 may vary depending on a location. For example, the dots may have the same size, but a distance between the dots may be changed. For example, a distance between the dots positioned close to the lens hole 235 may be relatively short, and a distance between the dots positioned far away from the lens hole 235 may be relatively long.

Figure 24:
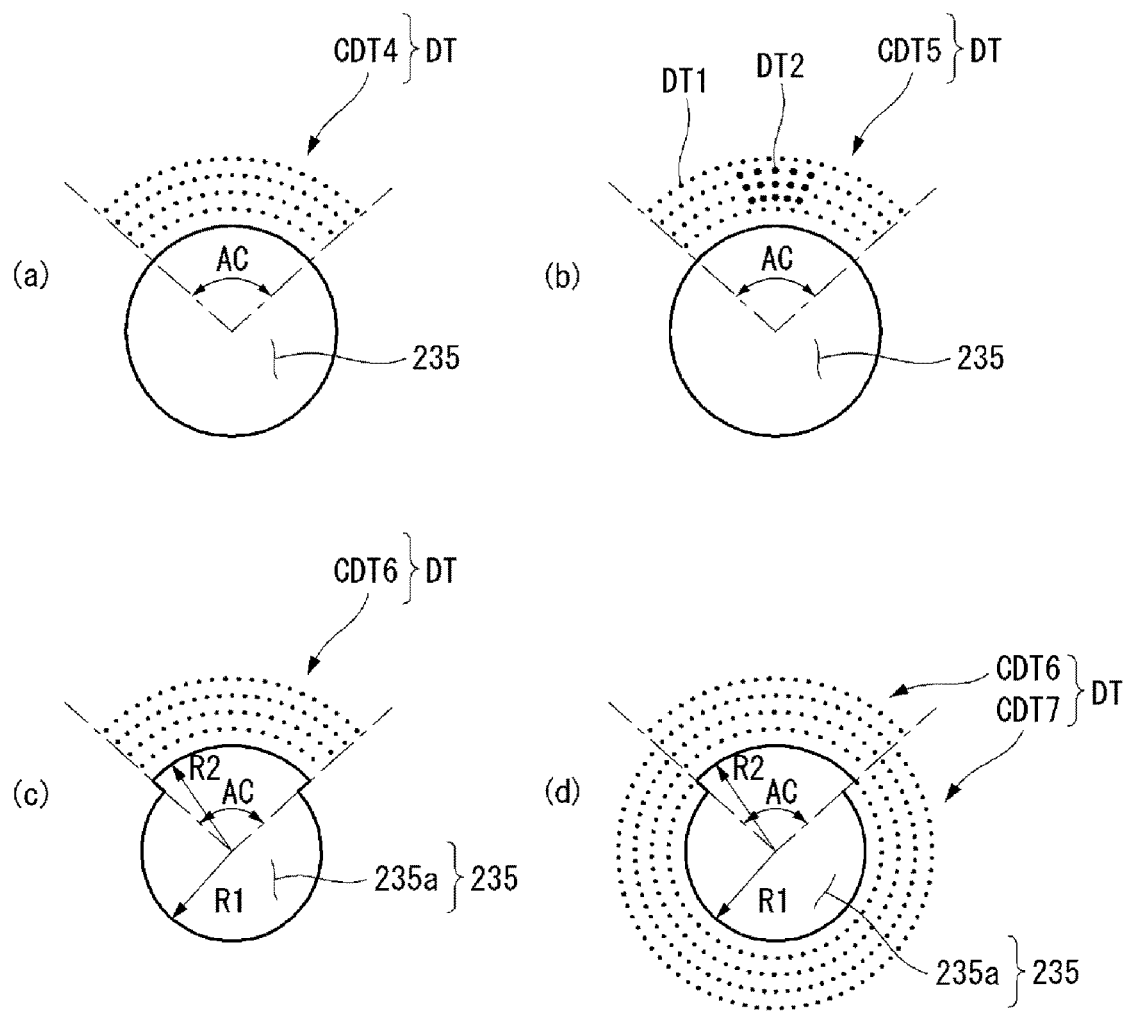

As shown in (a) of FIG. 24, a fourth ring-shapeddot area CDT4 may be formed around at least a portion of the lens hole 235. The fourth ring-shapeddot area CDT4 may be dots DT positioned in a portion corresponding to an angle AC in the lens hole 235. The fourth ring-shapeddot area CDT4 may be separated from the lens hole 235. Namely, the fourth ring-shapeddot area CDT4 may be formed at a location which is separated from a boundary of the lens hole 235 by a predetermined distance.

As shown in (b) of FIG. 24, a fifth ring-shapeddot area CDT5 may be formed around at least a portion of the lens hole 235. The fifth ring-shapeddot area CDT5 may include a first dot area DT1 and a second dot area DT2. An attribute of a dot constituting the first dot area DT1 may be different from an attribute of a dot constituting the second dot area DT2. For example, sizes of the dots constituting the first and second dot areas DT1 and DT2 may be different from each other. For example, a size of the dot constituting the second dot area DT2 may be greater than a size of the dot constituting the first dot area DT1. An area corresponding to the second dot area DT2 may be an area which can emit a larger amount of light than the lens positioned in the lens hole 235. Thus, the second dot area DT2 may be formed, so as to further reduce a reflectance of the fifth ring-shapeddot area CDT5 than other areas.

As shown in (c) of FIG. 24, the lens hole 235 may be a first lens hole 235a, which is not circular. As described above, a radius of at least a portion of the first lens hole 235a may be different from a radius of at least another portion of the first lens hole 235a. The first lens hole 235a may cause a portion of light to be emitted downwardly from the reflecting sheet 126, thereby controlling an amount of the light.

A sixth ring-shapeddot area CDT6 may be formed in an area AC. The area AC may be an area having a relatively large radius in the first lens hole 235a. For example, the sixth ring-shapeddot area CDT6 may be formed in an area having a radius R2. An amount of light emitted and/or reflected in a specific direction may be efficiently controlled by the area having the radius R2 and the sixth ring-shapeddot area CDT6.

As shown in (d) of FIG. 24, the lens hole 235 may be a first lens hole 235a, which is not circular. A sixth ring-shapeddot area CDT6 and a seventh ring-shapeddot area CDT7 may be formed around the first lens hole 235a. The sixth ring-shapeddot area CDT6 and the seventh ring-shapeddot area CDT7 may surround the first lens hole 235a.

Figure 25:
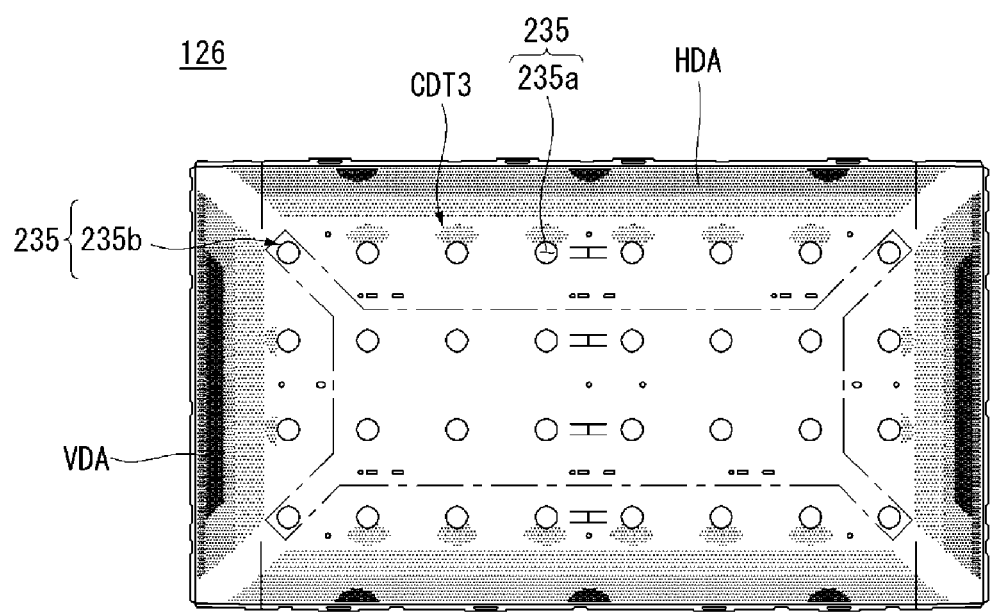

As shown in FIG. 25, the plurality of lens holes 235 may include first lens holes 235a and second lens holes 235b. A third ring-shapeddot area CDT3 may be formed in the first lens hole 235a. A radius of the first lens hole 235a may be changed. The first lens hole 235a may be positioned on the outside of the plurality of lens holes 235. For example, the first lens hole 235a may be a lens hole 235 positioned in an area close to the long side and/or the short side. For example, the first lens hole 235a may be a lens hole 235 positioned adjacent to a horizontal dot area HDA and/or a vertical dot area VDA. Namely, the third ring-shapeddot area CDT3 may be positioned between the first lens hole 235a and the horizontal dot area HDA and/or the vertical dot area VDA. Thus, an excessively large amount of light may be prevented from being reflected from the second sheet area 126b (refer to FIG. 11) of the reflecting sheet 126.

FIGS. 26 to 30 illustrate configuration related to a lens hole reflecting sheet according to an example embodiment of the invention.

As shown in FIGS. 26 to 30, the display device 100 according to the embodiment of the invention may further include a lens hole reflecting sheet 126d.

Figure 26:
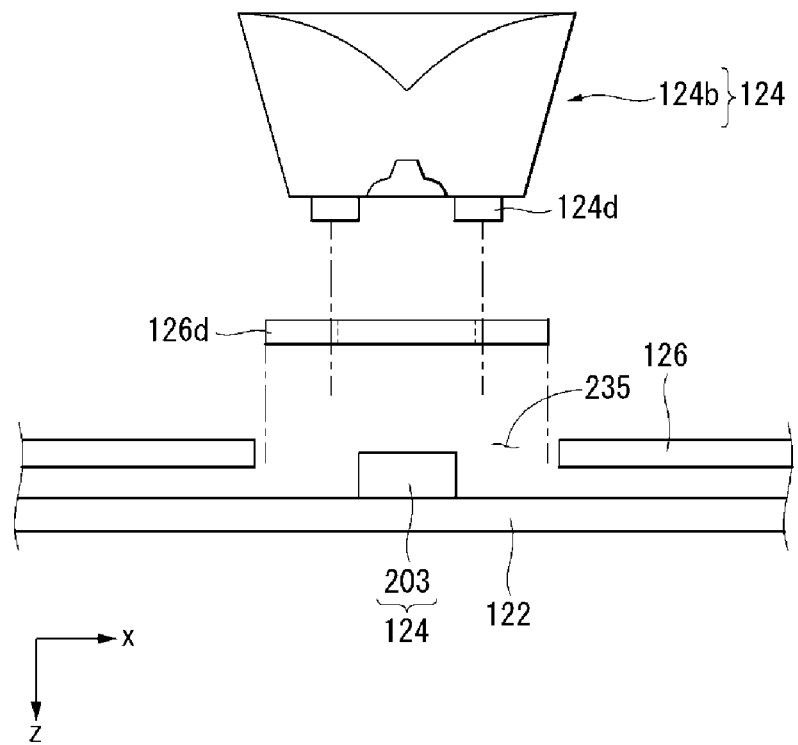
FIGS. 26 to 30 illustrate configuration related to a lens hole reflecting sheet according to an example embodiment of the invention.

As shown in FIG. 26, the lens hole reflecting sheet 126d may be inserted into a lens hole 235 of the reflecting sheet 126. The lens hole reflecting sheet 126d may be positioned between the lens 124b and the light source 203. The lens 124b may be a refractive lens or a reflective lens. The refractive or reflective lens 124b may emit light provided by the light source 203 at various angles. The lens hole reflecting sheet 126d may reflect light emitted downwardly from the lens 124b to the upward side of the lens 124b, thereby increasing light efficiency.

Figure 27:
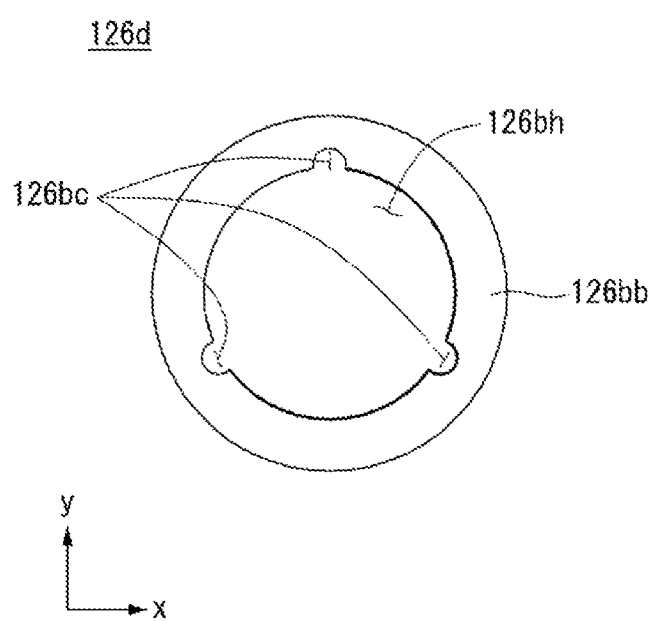

As shown in FIG. 27, the lens hole reflecting sheet 126d may include a hole 126bh and a ring unit 126bb.

The hole 126bh may be positioned in the middle of the lens hole reflecting sheet 126d. The light source 203 may be inserted into the hole 126bh.

The ring unit 126bb may be an outer peripheral area of the hole 126bh. The ring unit 126bb may include at least one lens coupling unit 126bc. For example, at least one lens leg 124d formed on the lower side of the lens 124b (refer to FIG. 26) may pass through the lens coupling unit 126bc.

Figure 28:
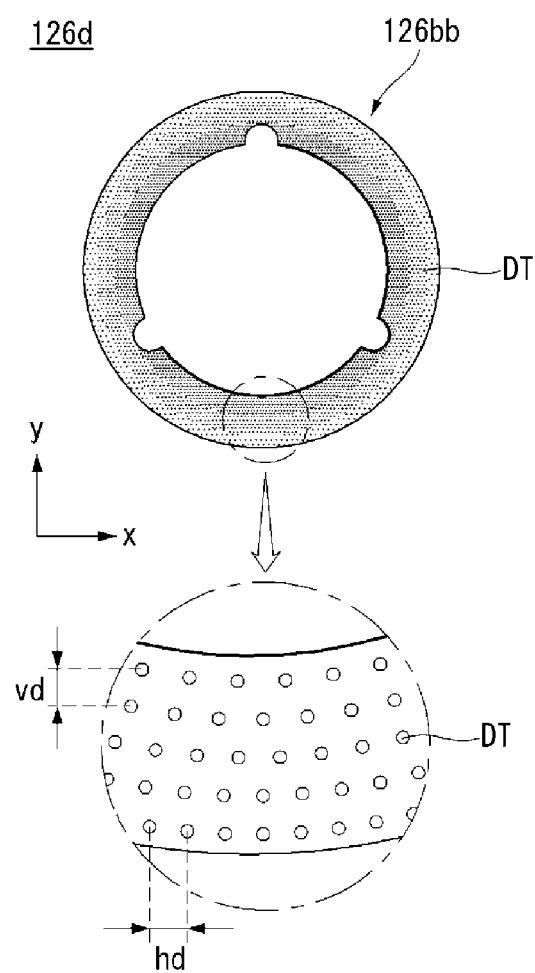

As shown in FIG. 28, dots DT may be formed in at least a portion of the ring unit 126bb. The dots DT may be separated from one another by a vertical distance vd and/or a horizontal distance hd. The vertical distance vd and/or the horizontal distance hd may be uniform. For example, the dots DT may be formed on the ring unit 126bb at regular intervals. The vertical distance vd and/or the horizontal distance hd may not be uniform. For example, the dots DT may be non-uniformly distributed on the ring unit 126bb.

Figure 29:
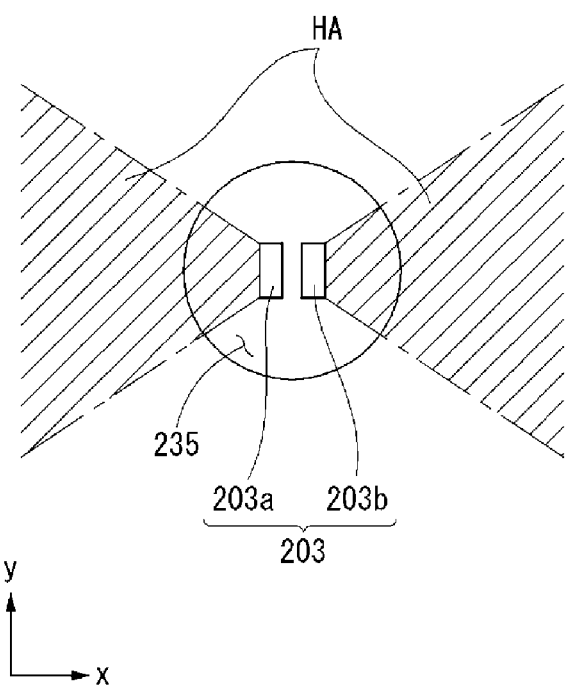

FIG. 29 shows that the lens 124b (refer to FIG. 26) and the lens hole reflecting sheet 126d (refer to FIG. 26) are not coupled. As shown in FIG. 29, one light source 203 may be configured as a plurality of LEDS. Namely, a plurality of LED chips may be used in one light package, and thus an intensity of light with respect to one light package may increase. The light source 203 may include first and second light sources 203a and 203b.

The first and second light sources 203a and 203b may be positioned adjacent to each other. For example, the rectangular first and second light sources 203a and 203b may be positioned in parallel with each other. The first and second light sources 203a and 203b may emit light having a predetermined directivity. For example, each of the first and second light sources 203a and 203b may mainly emit light in a radial direction HA of the outside direction.

Figure 30:
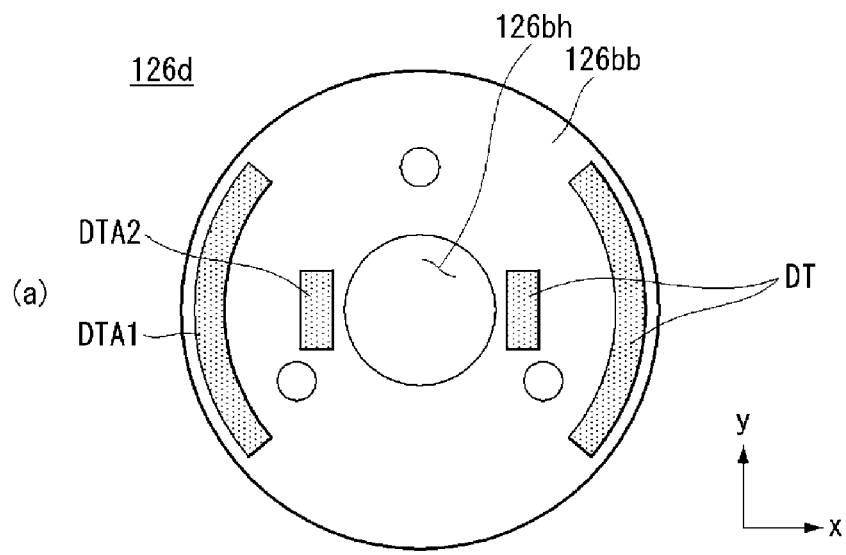
Figure 30:
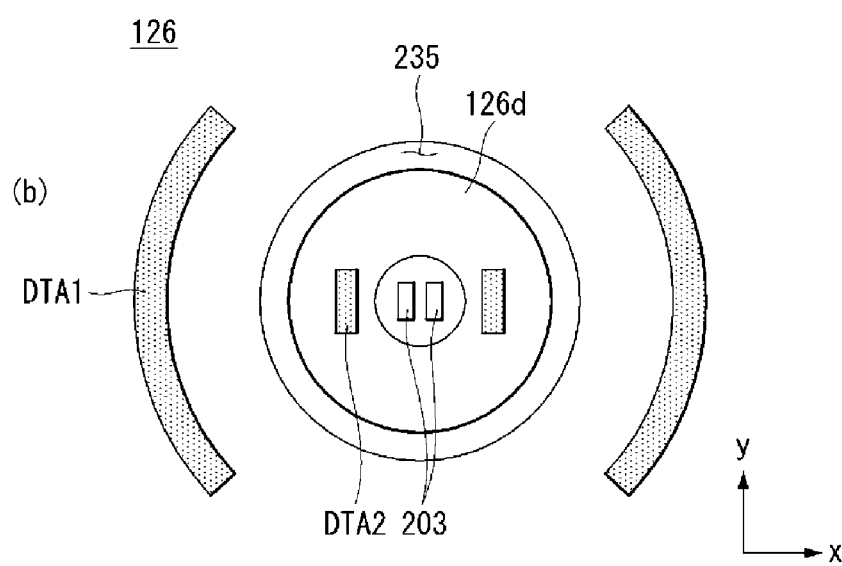

As shown in (a) of FIG. 30, dots DT may be formed in a predetermined area of the lens hole reflecting sheet 126d. The dots DT may have a configuration corresponding to radial characteristics of the first and second light sources 203a and 203b (refer to FIG. 29). For example, first and second dot areas DTA1 and DTA2 corresponding to the radial direction HA(refer to FIG. 29) may be formed.

The first and second dot areas DTA1 and DTA2 may be dots positioned on a path of the radial direction HA (refer to FIG. 29). For example, the first and second dot areas DTA1 and DTA2 may be formed at a predetermined width. The first and second dot areas DTA1 and DTA2 may be separated from each other. The second dot area DTA2 may be positioned further inside than the first dot area DTA1. A size of the first dot area DTA1 may be greater than a size of the second dot area DTA2 considering that light emitted from the first and second light sources 203a and 203b (refer to FIG. 29) is radiated in a fan shape. Only one of the first and second dot areas DTA1 and DTA2 may be formed, if necessary or desired.

As shown in (b) of FIG. 30, at least one of the first and second dot areas DTA1 and DTA2 may be formed in the reflecting sheet 126. For example, the first dot area DTA1 may be formed in the reflecting sheet 126, and the second dot area DTA2 may be formed in the lens hole reflecting sheet 126d. The first dot area DTA1 formed in the reflecting sheet 126 may be advantageous to control a reflection amount of light than when the first dot area DTA1 is formed in the lens hole reflecting sheet 126d having the relatively small area.

Figure 31:
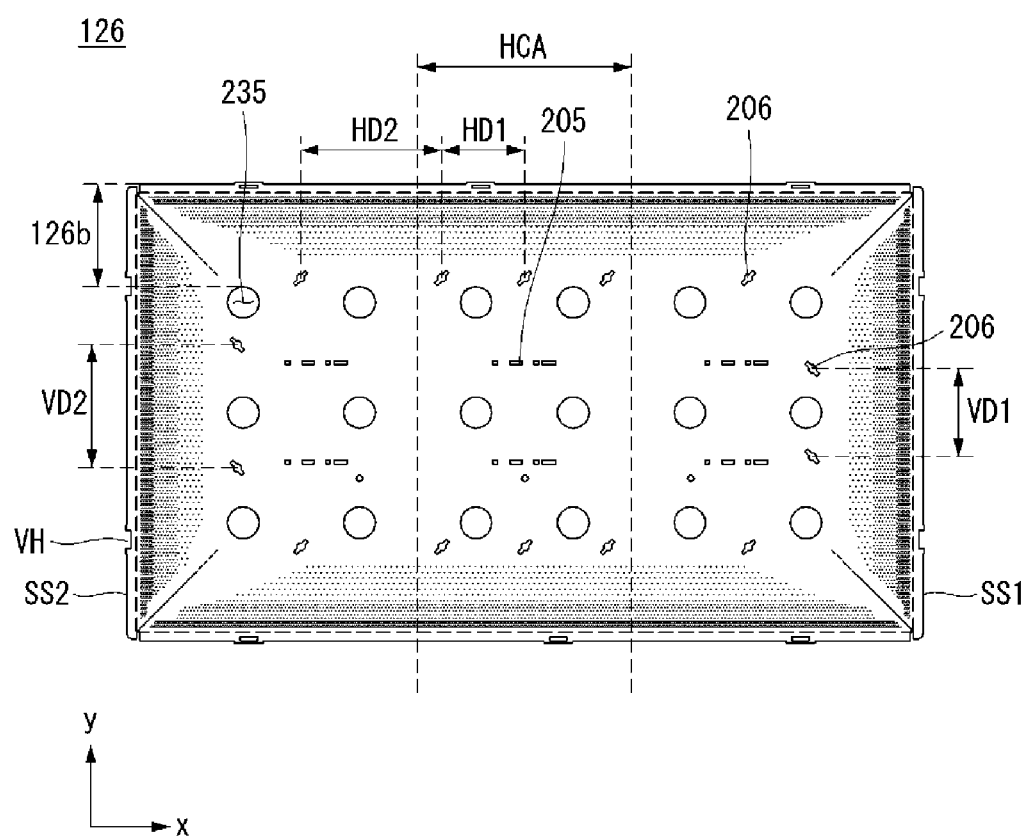
FIGS. 31 and 32 illustrate a reflecting sheet according to an example embodiment of the invention.
Figure 32:
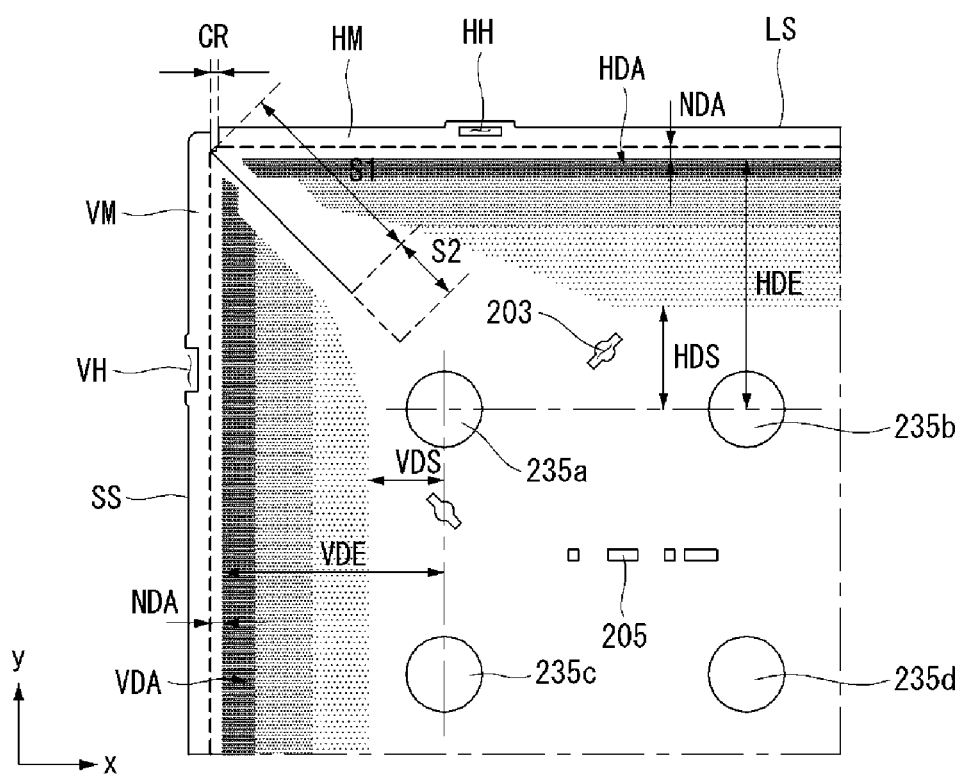

FIGS. 31 and 32 illustrate a reflecting sheet according to an example embodiment of the invention.

As shown in FIGS. 31 and 32, the reflecting sheet 126 according to the embodiment of the invention may include the dot area DA.

The dot area DA may be formed along the long side and/or the short side of the reflecting sheet 126. Namely, the dot area DA may be formed in the corner area of the reflecting sheet 126. In other words, the dot area DA may be formed in the second sheet area 126b (refer to FIG. 11) of the reflecting sheet 126 placed in the receiving unit 132 (refer to FIG. 10) of the frame 130 (refer to FIG. 10).

The dot area DA may include first and second horizontal dot areas HDA1 and HDA2 and first and second vertical dot areas VDA1 and VDA2. The first and second horizontal dot areas HDA1 and HDA2 are represented as the horizontal dot area HDA, and the first and second vertical dot areas VDA1 and VDA2 are represented as the vertical dot area VDA, except in the instance where they need to be distinguished from each other.

A shape of the horizontal dot area HDA may be different from a shape of the vertical dot area VDA. For example, the shape of the horizontal dot area HDA may not be symmetric to the shape of the vertical dot area VDA based on a cutting portion S1 positioned at the corner of the reflecting sheet 126.

The reflecting sheet 126 may include lens holes 235 for coupling the lenses 124b (refer to FIG. 11), fixing pin holes 206, supporter holes 205, a horizontal coupling unit HH, and a vertical coupling unit VH.

The lens holes 235 may be disposed in parallel with one another along the horizontal and vertical directions based on the size of the display device 100.

The fixing pin hole 206 may be coupled to the fixing pin 202 (refer to FIG. 10) for fixing the reflecting sheet 126 to the frame 130 (refer to FIG. 10). The fixing pin hole 206 may be positioned adjacent to the outermost lens hole 235. For example, the fixing pin hole 206 may be positioned between the adjacent lens holes 235 or between the lens hole 235 and the dot area DA.

The fixing pin hole 206 may be positioned adjacent to the lens hole 235 disposed on the outermost side. For example, the fixing pin hole 206 may be positioned closer to the outermost side than the outermost lens hole 235. For example, the fixing pin hole 206 may be positioned at a location overlapping the outermost lens hole 235.

When the fixing pin 202 (refer to FIG. 10) is coupled to the frame 130 (refer to FIG. 10) through the fixing pin hole 206, the second sheet area 126b may be naturally formed. Namely, when the fixing pin 202 (refer to FIG. 10) is coupled to the frame 130 (refer to FIG. 10) through the fixing pin hole 206 formed in the horizontal and vertical directions, a round chamfer may be formed in the outer area of the reflecting sheet 126.

A distance between the fixing pin holes 206 may be differently set. For example, a number of fixing pin holes 206 positioned in a horizontal center area HCA may be more than a number of fixing pin holes 206 positioned in other areas based on the horizontal direction of the reflecting sheet 126.

A distance between the fixing pin holes 206 positioned in the horizontal center area HCA may be called a first horizontal distance HD1, and a distance between the fixing pin holes 206 positioned in areas other than the horizontal center area HCA may be called a second horizontal distance HD2. The first horizontal distance HD1 may be less than the second horizontal distance HD2. Namely, the fixing pin holes 206 in the horizontal center area HCA may be more densely disposed. Thus, a round chamfer may be naturally formed at the four upper, lower, left, and right corners of the reflecting sheet 126 while the reflecting sheet 126 is efficiently fixed.

The fixing pin holes 206 disposed in the vertical direction may exist. For example, the fixing pin holes 206 may be disposed along the left and right short sides of the reflecting sheet 126.

The fixing pin holes 206 on the first short side SS1 may be disposed at predetermined intervals of a first vertical distance VD1. The fixing pin holes 206 on the second short side SS2 may be disposed at predetermined intervals of a second vertical distance VD2. The first vertical distance VD1 and the second vertical distance VD2 may be different from each other. The second vertical distance VD2 may be greater than the first vertical distance VD1.

A difference between the first vertical distance VD1 and the second vertical distance VD2 may be generated by a shape of the frame 130 coupled to the reflecting sheet 126. For example, the difference between the first vertical distance VD1 and the second vertical distance VD2 may be generated by a coupling space of a rib for assisting rigidity of the frame 130 and/or various electronic parts coupled to the frame 130. The supporter holes 205 may be coupled to the supporters 200. The supporter holes 205 may support the diffusion plate 129 (refer to FIG. 5) and/or the optical sheet 125 (refer to FIG. 5) on the reflecting sheet 126. The supporter holes 205 may be positioned in the middle of the reflecting sheet 126 for the efficient support. Namely, the supporter hole 205 may be positioned further inside than the outermost lens hole 235.

The horizontal coupling unit HH and the vertical coupling unit VH may be disposed along the corner area of the reflecting sheet 126. The horizontal coupling unit HH and the vertical coupling unit VH may be inserted into the protrusions of the frame 130 (refer to FIG. 10).

FIG. 32 shows one edge area of the reflecting sheet 126.

Outermost lens holes 235a to 235c may mean the lens hole 235 positioned on the outermost side. Among the outermost lens holes 235a to 235c, the first and second outermost lens holes 235a and 235b positioned on the upper side may be separated from the lower side of the horizontal dot area HDA by a first distance HDS and may be separated from the upper side of the horizontal dot area HDA by a second distance HDE. Among the outermost lens holes 235a to 235c, the first and third lens holes 235a and 235c positioned on the side may be separated from the lower side of the vertical dot area VDA by a third distance VDS and may be separated from the upper side of the vertical dot area VDA by a fourth distance VDE.

The first distance HDS may be different from the third distance VDS, and the second distance HDE may be different from the fourth distance VDE. This means that a width, a length, etc., of the horizontal dot area HDA may be different from a width, a length, etc., of the vertical dot area VDA.

The first distance HDS may be greater than the third distance VDS. Namely, a distance between the horizontal dot area HDA and the lens hole 235 is greater than a distance between the vertical dot area VDA and the lens hole 235.

The second sheet area 126b (refer to FIG. 11) corresponding to the horizontal dot area HDA may be shorter than the second sheet area 126b (refer to FIG. 11) corresponding to the vertical dot area VDA. Because lengths of the long side and the short side of the second sheet area 126b are different from each other, a slope of the round chamfer of the vertical dot area VDA on the short side may be greater than a slope of the round chamfer of the horizontal dot area HDA on the long side. An increase in the slope may increase a reflectance. When the reflectance increases, a corresponding portion may look brighter. In the reflecting sheet 126 according to the embodiment of the invention, because the vertical dot area VDA is positioned closer to the lens hole 235 than the horizontal dot area HDA, the reflectance may be controlled in spite of the high slope of the vertical dot area VDA on the short side of the reflecting sheet 126.

The non-dot area NDA may be positioned between the horizontal/vertical dot area HDA or VDA and a horizontal/vertical margin area HM or VM. Namely, the non-dot area NDA not including the dot DT may be positioned on the horizontal/vertical dot area HDA or VDA, so that the user watching the display device 100 cannot recognize the dots DT. The non-dot area NDA is formed considering that the dots DT may be recognized from the outside when the dots DT exist in a corresponding area.

The horizontal and vertical margin areas HM and VM may correspond to the third sheet area 126c. Namely, the horizontal and vertical margin areas HM and VM may be an outermost area of the reflecting sheet 126. In other words, the horizontal and vertical margin areas HM and VM may be an area of the reflecting sheet 126 contacting the third frame area 130c of the frame 130 (refer to FIG. 11). The dots DT may not exist in the horizontal/vertical margin area HM or VM.

A gap CR may exist between the horizontal margin area HM and the vertical margin area VM. The reflecting sheet 126 may be a plane. Namely, the reflecting sheet 126 may be a two-dimensional plane. When the reflecting sheet 126 of the two-dimensional shape is coupled to the receiving unit 132 (refer to FIG. 10) of the three-dimensional shape, the reflecting sheet 126 may be changed into the three-dimensional shape. The shape of the reflecting sheet 126 may be changed by overlapping at least a portion of the reflecting sheet 126 along the cutting portion S1. A shadow may be generated by the overlap of the reflecting sheet 126. The gap CR may prevent the overlap of the reflecting sheet 126 and thus suppress the generation of the shadow.

A folded portion S2 may extend from an end of the cutting portion S1. The folded portion S2 may not be cut, unlike the cutting portion S1. The folded portion S2 may be formed by previously folding a corresponding area along the cutting portion S1. Thus, when the reflecting sheet 126 is changed into the three-dimensional shape in the receiving unit 132 (refer to FIG. 10), the reflecting sheet 126 may be guided by the folded portion S2 and may be changed into a previously designed shape.

Figure 33:
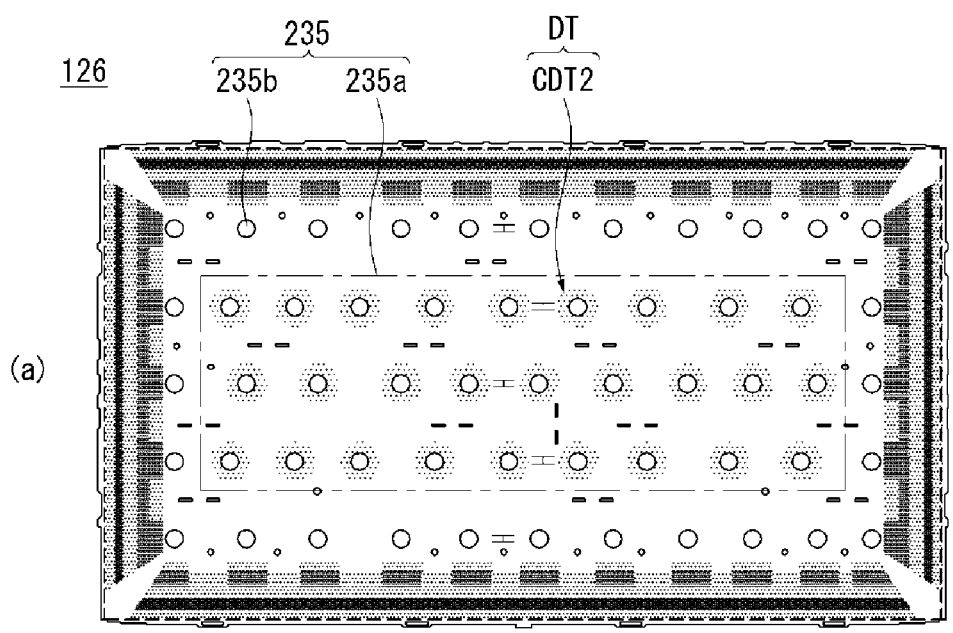
FIG. 33 illustrate configuration related to a lens hole of a reflecting sheet according to an example embodiment of the invention.
Figure 33:
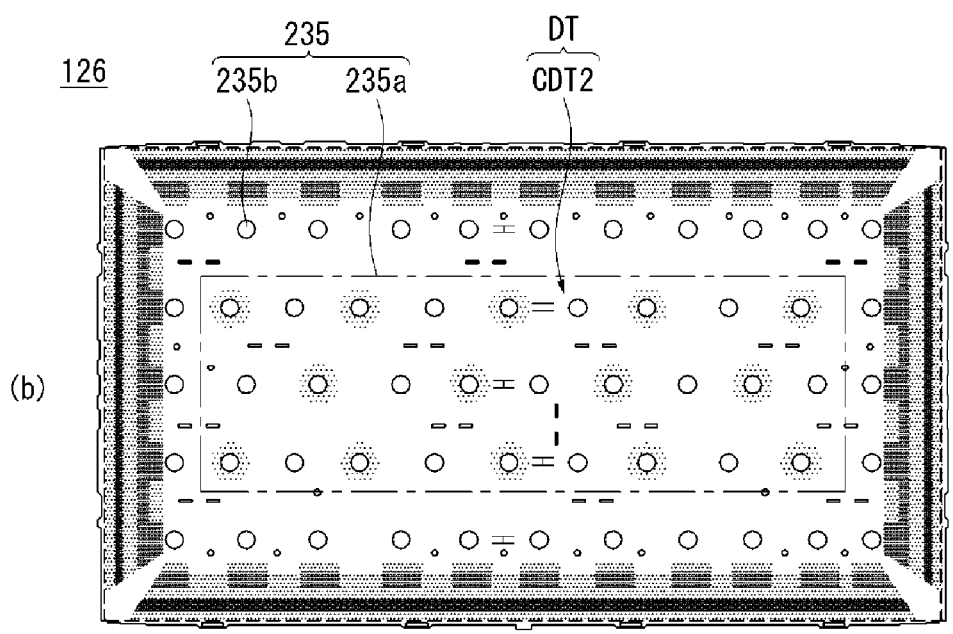

FIG. 33 illustrate configuration related to a lens hole of a reflecting sheet according to an example embodiment of the invention As shown in FIG. 33, the lens hole 235 may include first lens holes 235a and second lens holes 235b.

As shown in (a) of FIG. 33, the first lens hole 235a may be a lens hole 235 having a ring-shapeddot area. A location of the first lens hole 235a having the ring-shapeddot area may be different from a location of the second lens hole 235b not having the ring-shapeddot area. For example, the first lens holes 235a may be positioned in the inner area of the reflecting sheet 126, and the second lens holes 235b may be positioned in the outer area of the reflecting sheet 126. The locations of the first and second lens holes 235a and 235b may be changed.

The lens holes 235 may be arranged in the horizontal direction and/or the vertical direction. The lens holes 235 arranged in the horizontal direction and/or the vertical direction may be disposed in parallel with one another. Such a disposition or arrangement can achieve the common design and the common manufacturing process and can obtain an effect capable of reducing the cost.

The lens holes 235 arranged in the horizontal direction and/or the vertical direction may not be disposed in parallel with one another. For example, the lens holes 235 may be disposed in a zigzag pattern in the vertical direction. Such a disposition or arrangement can obtain an effect reducing a light overlap and/or a light shade between the lens holes 235.

Because the first lens hole 235a is positioned in the inner area of the reflecting sheet 126, a luminance of the first sheet area 126a (refer to FIG. 11) of the reflecting sheet 126 may be more uniformly controlled. This can be clearly understood considering that light emitted from the lens holes 235 is relatively bright around the lens holes 235 and becomes darker as it is far away from the lens holes 235. The first lens hole 235a, in which dots are formed, may control a brightness and/or a reflectance around the lens hole 235 and may homogenize an entire luminance.

As shown in (b) of FIG. 33, the first lens holes 235a may be disposed in accordance with a predetermined rule. For example, the lens hole positioned in one of the left and right directions or one of the plurality of lens holes 235 may be the first lens hole 235a. The first lens holes 235a may be disposed in the zigzag pattern in the vertical direction. Namely, the first lens holes 235a may not be in parallel with one another in the vertical direction. Such a disposition may minimize a reduction in the entire brightness by the first lens hole 235a and may homogenize the luminance.

Figure 34:
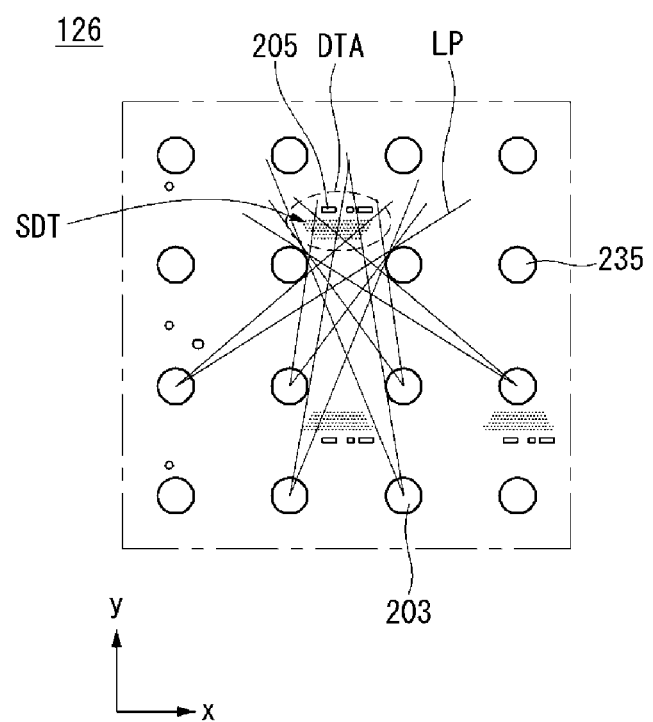
FIGS. 34 and 35 illustrate configuration related to a supporter hole of a reflecting sheet according to an example embodiment of the invention.
Figure 35:
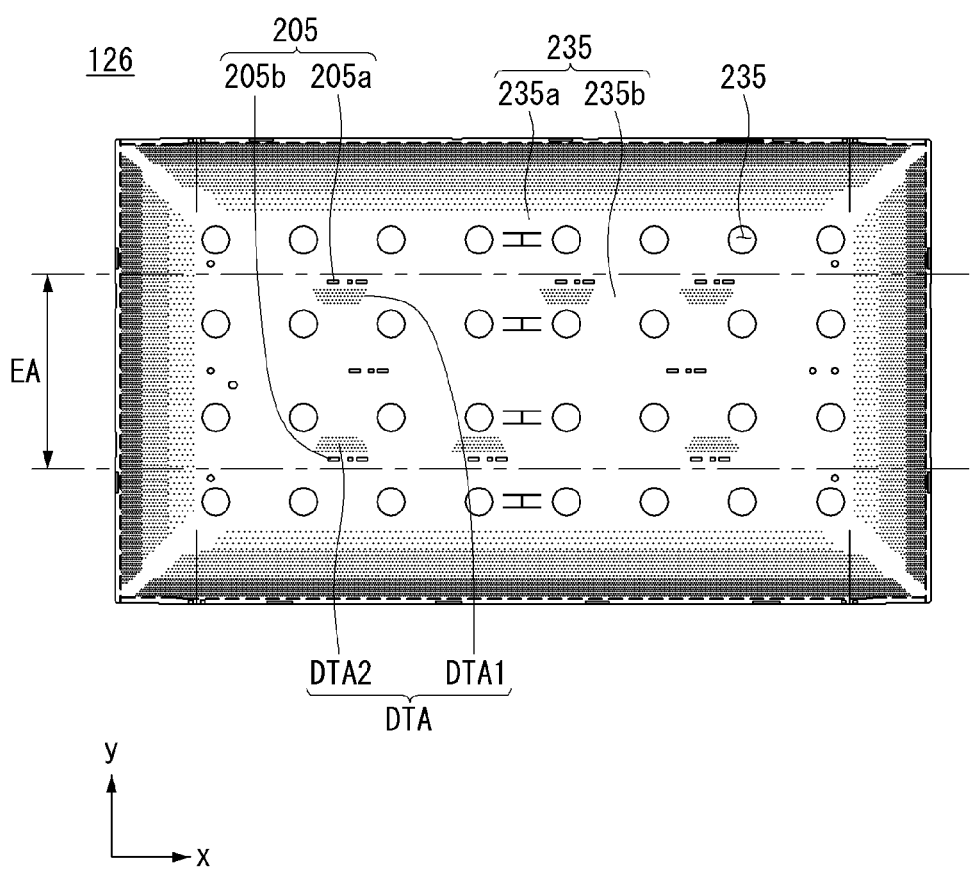

FIGS. 34 and 35 illustrate configuration related to a supporter hole of a reflecting sheet according to an example embodiment of the invention.

As shown in FIGS. 34 and 35, the reflecting sheet 126 of the display device 100 according to the embodiment of the invention may uniformly reflect light through a dot area DTA formed around a supporter hole 205.

As shown in FIG. 34, a plurality of lens holes 235 may be formed on the reflecting sheet 126. Each of the light sources 203 coupled to the plurality of lens holes 235 may emit light.

The supporter hole 20 5 may be formed on the reflecting sheet 126. As described above, the supporter hole 205 may have a configuration for the coupling of the supporter 200 (refer to FIG. 10).

The supporter hole 205 may be positioned further inside than the lens hole 235, which is positioned on the outermost side. For example, the supporter hole 205 may be positioned between the lens holes 235.

The supporter hole 205 may be affected by the plurality of light sources 203 coupled to the plurality of lens holes 235. For example, light emitted from the plurality of light sources 203 may affect the specific supporter hole 205 considering a light path LP with respect to the specific supporter hole 205.

As described above, the supporter hole 205 maybe coupled to the supporter 200 (refer to FIG. 10). The supporter 200 may be formed of plastic and/or rubber material. The supporter 200 may reflect at least a portion of light. The reflecting sheet 126 according to the embodiment of the invention may have a dot area DTA in consideration of the reflection of the supporter 200, on which light can be overlappingly concentrated. Namely, the dot area DTA may be formed around the supporter hole 205, so as to reduce an influence of the supporter 200 on the reflection of the reflecting sheet 126.

As shown in FIG. 35, the dot area DTA around the supporter hole 205 may be formed toward an inner area EA of the reflecting sheet 126. Namely, the dot area DTA may be positioned further inside than the supporter hole 205.

The plurality of dot areas DTA around the supporter holes 205 may be positioned opposite each other. For example, when first and second supporter holes 205a and 205b exist, first and second dot areas DTA1 and DTA2 may be positioned adjacent to the first and second supporter holes 205a and 205b further inside than the first and second supporter holes 205a and 205b.

The dot area DTA around the supporter hole 205 may have a semicircular shape centering around the supporter hole 205. Namely, a center area of the dot area DTA, which is relatively greatly affected by the supporter 200 (refer to FIG. 10), may be protrudingly configured.

FIGS. 36 to 39 illustrate configuration related to a cutting portion of a reflecting sheet according to an example embodiment of the invention.

As shown in FIGS. 36 to 39, the reflecting sheet 126 of the display device 100 according to the embodiment of the invention may include a cutting portion HC uniformly reflecting light.

Figure 36:
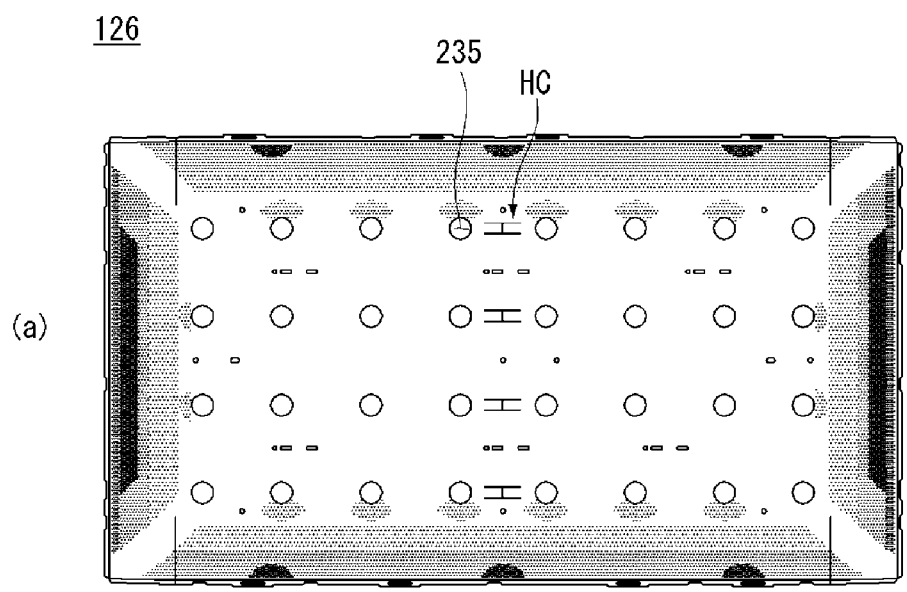
FIGS. 36 to 39 illustrate configuration related to a cutting portion of a reflecting sheet according to an example embodiment of the invention.
Figure 36:
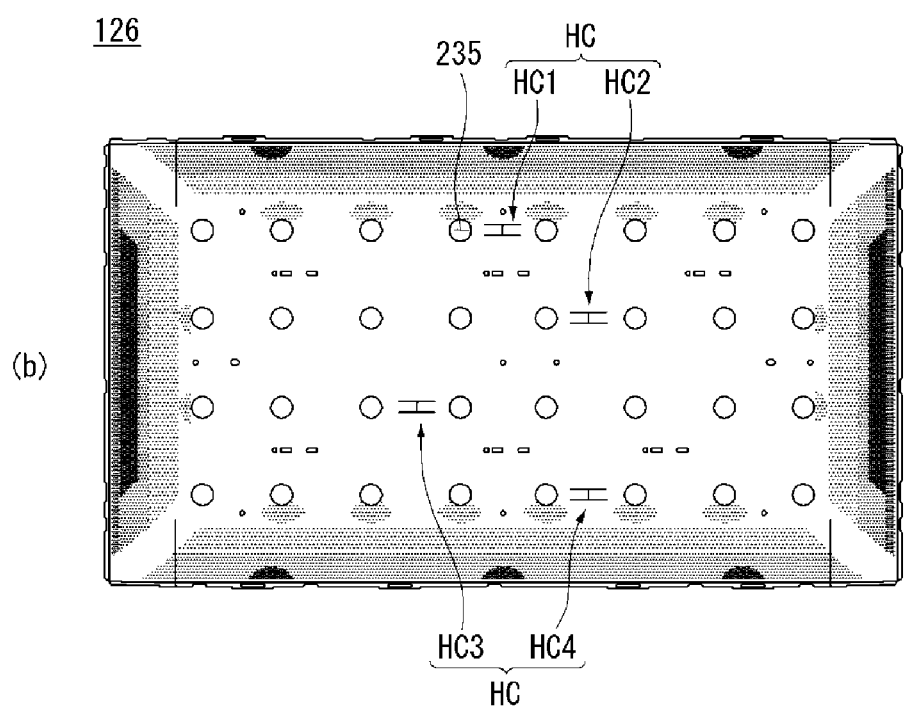

As shown in FIG. 36, a lens hole 235 may include a first lens hole 235a and a second lens hole 235b.

As shown in (a) of FIG. 36, the first lens hole 235a may be a lens hole 235 including ring-shaped dots DT. A location of the first lens hole 235a including the dots DT may be different from a location of the second lens hole 235b not including the dot DT. For example, the first lens hole 235a may be positioned in the inner area of the reflecting sheet 126, and the second lens hole 235b may be positioned in the outer area of the reflecting sheet 126. The locations of the first and second lens holes 235a and 235b may be changed.

Because the first lens hole 235a is positioned in the inner area of the reflecting sheet 126, an effect capable of more uniformly controlling a luminance of the first sheet area 126a (refer to FIG. 11) of the reflecting sheet 126 may be expected. This can be clearly understood considering that light emitted from the lens hole 235 is relatively bright around the lens hole 235 and becomes darker as it is far away from the lens hole 235. The first lens hole 235a, in which the dots DT are formed, may control a brightness and/or a reflectance around the lens hole 235 and may homogenize an entire luminance.

As shown in (b) of FIG. 36, the first lens holes 235a may be disposed in accordance with a predetermined rule. For example, the lens hole positioned in one of the left and right directions or one of the plurality of lens holes 235 may be the first lens hole 235a. The first lens holes 235a may be disposed in the zigzag pattern in the vertical direction. Namely, the first lens holes 235a may not be in parallel with one another in the vertical direction. Such a disposition may minimize a reduction in the entire brightness by the first lens hole 235a and may homogenize the luminance.

Figure 37:
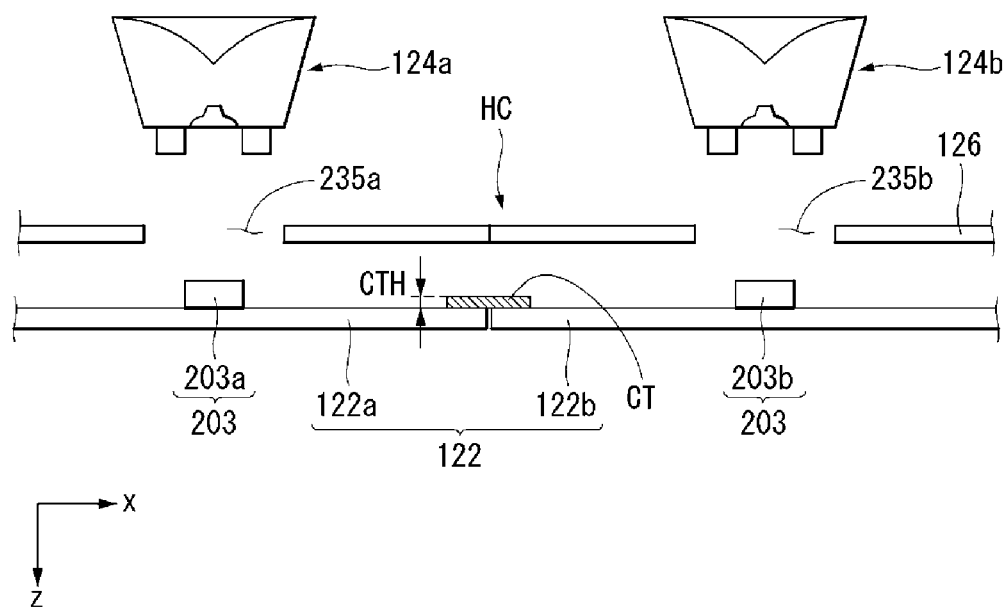

As shown in FIG. 37, the substrate 122 may have a shape, in which a first substrate 122a and a second substrate 122b are connected. Namely, the substrate 122, on which the light source 203 is mounted in the rear of the reflecting sheet 126, may be divided into a plurality of substrates. A first light source 203a may be positioned at the first substrate 122a, and a second light source 203b may be positioned at the second substrate 122b. The first and second substrates 122a and 122b may be connected through a connector CT.

The connector CT may be positioned between the first and second substrates 122a and 122b. The connector CT may be a structure electrically and/or physically connected to the first and second substrates 122a and 122b. For example, the connector CT may be a soldering area.

The connector CT may protrude in the direction of the reflecting sheet 126 by a distance CTH further than the substrate 122.

The cutting portion HC may correspond to the connector CT. For example, the cutting portion HC may be positioned on the connector CT.

Figure 38:
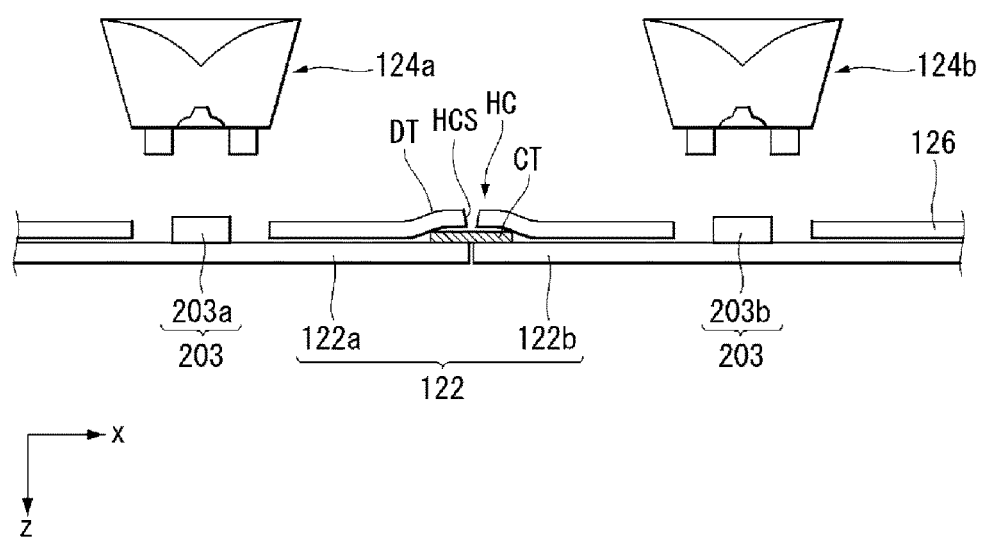

As shown in FIG. 38, when the reflecting sheet 126 is coupled to the substrate 122, cutting surfaces HCS of the cutting portion HC may be separated from each other. Namely, a gap may be naturally generated between the cutting surfaces HCS by the connector CT, which upwardly protrudes. When the cutting surfaces HCS are coupled to the connector CT, a wrinkle of the reflecting sheet 126 resulting from the connector CT may be prevented. Thus, the non-uniformity of light resulting from the wrinkle of the reflecting sheet 126 may be prevented.

The dots DT may be formed in the cutting surface HCS. Namely, the dots DT may be formed in a corresponding area, so as to control an amount of light reflected from the cutting surface HCS, which relatively upwardly protrudes.

Figure 39:
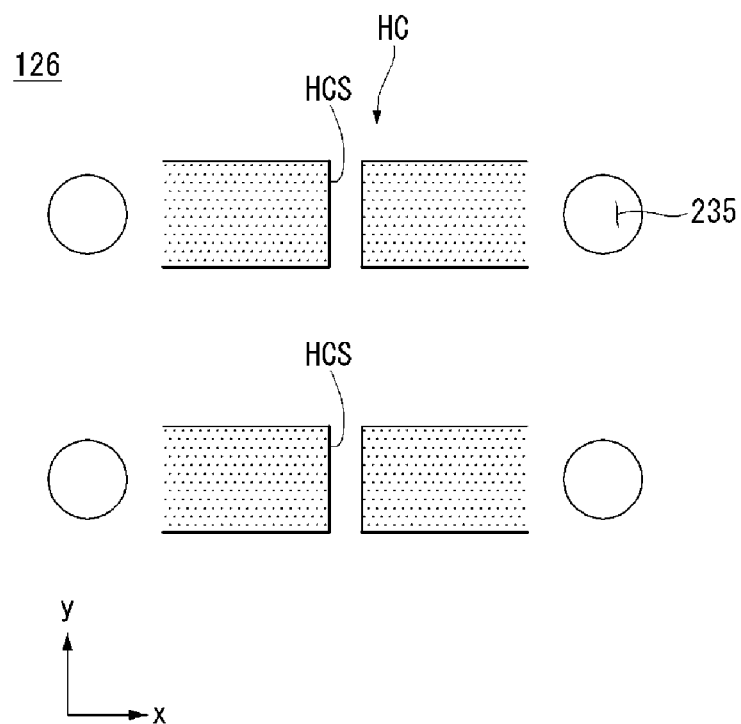

As shown in FIG. 39, the dots DT may be formed in the cutting portion HC. The dots DT may be positioned about the cutting surface HCS of the cutting portion HC. For example, the dots DT may be positioned in the left and right cutting surfaces HCS of the cutting portion HC. Thus, the non-uniformity of the luminance resulting from the cutting surfaces HCS may be minimized.

The embodiments and/or the configurations of the invention may be combined with each other. For example, a configuration "A" described in one embodiment of the invention and the drawings and a configuration "B" described in another embodiment of the invention and the drawings may be combined with each other. Namely, although the combination between the configurations is not directly described, the combination is possible except in the instance where it is described that the combination is impossible. This is certain considering that the embodiment of the invention relates to the display device.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a frame including a bottom and a sidewall extending from the bottom;
   at least one substrate located on the frame, and a plurality of light sources mounted on the at least one substrate; and
   a reflecting sheet located on the at least one substrate, wherein the reflecting sheet comprises:
   a first sheet part located on the bottom, the first sheet part including a plurality of holes corresponding to the plurality of the light sources; and
   a second sheet part extended from the first sheet part, the second sheet part including a horizontal dot area located along a long side of the reflecting sheet and a vertical dot area located along a short side of the reflecting sheet, and at least one of the horizontal dot area and the vertical dot area comprising first areas and second areas,
   wherein the first areas are aligned with outermost holes among the plurality of holes, and the second areas are located between the first areas,
   wherein the first areas and the second areas include a plurality of dot areas,
   wherein the first areas are closer to the outermost holes than the second areas,
   wherein each of the dot areas includes a plurality of dots,
   wherein a size of dots included in one of the plurality of dot areas is different from a size of dots included in another of the plurality of dot areas in the first area,
   wherein a size of dots included in one of the plurality of dot areas is different from a size of dots included in another of the plurality of dot areas in the second area,
   wherein the first and second areas comprise inner dot areas, the inner dot areas are positioned at a same distance between a first distance and a second distance from a line, the line being an imaginary line connecting the outermost holes along at least one of the long side and the short side of the reflecting sheet, and
   wherein a density of dots included in the inner dot area of the first area is greater than a density of dots included in the inner dot area of the second area.

2. The backlight unit of claim 1, wherein the first and second areas comprise outer dot areas positioned at a same distance between the second distance and a third distance from the line, and
   wherein the density of dots included in the inner dot area of the first area is greater than a density of dots included in the outer dot area of the first area.

3. The backlight unit of claim 1, wherein the first and second areas comprise outer dot areas positioned at a same distance between the second distance and a third distance from the line, and
   wherein the density of dots included in the inner dot area of the second area is smaller than a density of dots included in the outer dot area of the second area.

4. The backlight unit of claim 1, wherein the line includes a first line along the long side of the reflecting sheet and a second line along the short side of the reflecting sheet, and
   wherein a distance between the first line and a closest dot to the first line on the horizontal dot area is greater than a distance between the second line and a closest dot to the second line on the vertical dot area.

5. The backlight unit of claim 1, wherein dot patterns of the horizontal dot area are different from dot patterns of the vertical dot area.

6. The backlight unit of claim 1, wherein an area of the horizontal dot area is different from an area of the vertical dot area.

7. The backlight unit of claim 1, wherein, in a corner of the reflecting sheet, a shape of the horizontal dot area is asymmetric with a shape of the vertical dot area.

8. The backlight unit of claim 1, wherein the line includes a first line along the long side of the reflecting sheet and a second line along the short side of the reflecting sheet, and
   wherein a distance between the first line and a farmost dot in a vertical direction from the first line on the horizontal dot area is different from a distance between the second line and a farmost dot in a horizontal direction from the second line on the vertical dot area.

9. The backlight unit of claim 1, wherein the reflecting sheet further comprises a third sheet part extending from the second sheet part and being located on the sidewall.

10. The backlight unit of claim 9, wherein, in the second sheet part, the density of dots of the first areas and the second areas increases as the dots approach the third sheet part.

11. The backlight unit of claim 9, wherein the first areas further include a third dot area,
    wherein the third dot area is closer to the third sheet part rather than the inner dot area, and wherein a density of dots included in the third dot area is smaller than the density of dots included in the inner dot area.

12. The backlight unit of claim 11, wherein the density of dots included in the outer dot area is smaller than the density of dots included in the inner dot area.

13. The backlight unit of claim 9, wherein the third sheet part comprises a long third sheet part along the long side of the reflecting sheet and a short third sheet part along the short side of the reflecting sheet,
wherein the line includes a first line along the long side of the reflecting sheet and a second line along the short side of the reflecting sheet, and
wherein a distance between the first line and the long third sheet part is different from a distance between the second line and the short third sheet part.

14. The backlight unit of claim 1, wherein the second sheet part is bent from the first sheet part.

15. The backlight unit of claim 1, wherein the first area and the second area are sequentially positioned.

16. A display device comprising:
a display panel;
a backlight unit at a rear of the display panel; and
a back cover at a rear of the backlight unit,
wherein the backlight unit comprises:
a frame including a bottom and a sidewall extending from the bottom;
at least one substrate located on the frame, and a plurality of light sources mounted on the at least one substrate; and
a reflecting sheet located on the at least one substrate,
wherein the reflecting sheet comprises:
a first sheet part located on the bottom, the first sheet part including a plurality of holes corresponding to the plurality of the light sources; and
a second sheet part extended from the first sheet part, the second sheet part including a horizontal dot area located along a long side of the reflecting sheet and a vertical dot area located along a short side of the reflecting sheet, and at least one of the horizontal dot area and the vertical dot area comprising first areas and second areas,
wherein the first areas are aligned with outermost holes among the plurality of holes, and the second areas are located between the first areas,
wherein the first areas and the second areas include a plurality of dot areas,
wherein the first areas are closer to the outermost holes than the second areas,
wherein each of the dot areas includes a plurality of dots,
wherein a size of dots included in one of the plurality of dot areas is different from a size of dots included in another of the plurality of dot areas in the first area,
wherein a size of dots included in one of the plurality of dot areas is different from a size of dots included in another of the plurality of dot areas in the second area,
wherein the first and second areas comprise inner dot areas, the inner dot areas are positioned at a same distance between a first distance and a second distance from a line, the line being an imaginary line connecting the outermost holes along at least one of the long side and the short side of the reflecting sheet, and
wherein a density of dots included in the inner dot area of the first area is greater than a density of dots included in the inner dot area of the second area.

17. The display device of claim 16, wherein the first and second areas comprise outer dot areas positioned at a same distance between the second distance and a third distance from the line, and
wherein a density of dots included in the inner dot area of the first area is greater than a density of dots included in the outer dot area of the first area.

18. The display device of claim 16, wherein the first and second areas comprise outer dot areas positioned at a same distance between the second distance and a third distance from the line, and
wherein a density of dots included in the inner dot area of the second area is smaller than a density of dots included in the outer dot area of the second area.

19. The display device of claim 16, wherein the line includes a first line along the long side of the reflecting sheet and a second line along the short side of the reflecting sheet, and
wherein a distance between the first line and a closest dot to the first line on the horizontal dot area is greater than a distance between the second line and a closest dot to the second line on the vertical dot area.

20. The display device of claim 16, wherein dot patterns of the horizontal dot area are different from dot patterns of the vertical dot area.

21. The display device of claim 16, wherein an area of the horizontal dot area is different from an area of the vertical dot area.

22. The display device of claim 16, wherein, in a corner of the reflecting sheet, a shape of the horizontal dot area is asymmetric with a shape of the vertical dot area.

23. The display device of claim 16, wherein the line includes a first line along the long side of the reflecting sheet and a second line along the short side of the reflecting sheet, and
wherein a distance between the first line and a farmost dot in a vertical direction from the first line on the horizontal dot area is different from a distance between the second line and a farmost dot in a horizontal direction from the second line on the vertical dot area.

24. The display device of claim 16, wherein the reflecting sheet further comprises a third sheet part extending from the second sheet part and being located on the sidewall.

25. The display device of claim 24, wherein, in the second sheet part, the density of dots of the first areas and the second areas increases as the dots approach the third sheet part.

26. The display device of claim 24, wherein the first areas further include a third dot area,
wherein the third dot area is closer to the third sheet part rather than the inner dot area, and
wherein a density of dots included in the third dot area is smaller than the density of dots included in the inner dot area.

27. The display device of claim 26, wherein the density of dots included in the outer dot area is smaller than the density of dots included in the inner dot area.

28. The display device of claim 24, wherein the third sheet part comprises a long third sheet part along the long side of the reflecting sheet and a short third sheet part along the short side of the reflecting sheet,
wherein the line includes a first line along the long side of the reflecting sheet and a second line along the short side of the reflecting sheet, and
wherein a distance between the first line and the long third sheet part is different from a distance between the second line and the short third sheet part.

29. The display device of claim 16, wherein the second sheet part is bent from the first sheet part.

30. The display device of claim 16, wherein the first area and the second area are sequentially positioned.

* * * * *